US 8,774,255 B2

(12) United States Patent
Gotou et al.

(10) Patent No.: US 8,774,255 B2
(45) Date of Patent: Jul. 8, 2014

(54) SEMICONDUCTOR INTEGRATED CIRCUIT AND ELECTRONIC APPARATUS PROVIDED WITH SAME

(71) Applicant: Panasonic Corporation, Osaka (JP)

(72) Inventors: Tetsuji Gotou, Osaka (JP); Hiroo Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/732,991

(22) Filed: Jan. 2, 2013

(65) Prior Publication Data

US 2013/0136162 A1    May 30, 2013

Related U.S. Application Data

(63) Continuation of application No. PCT/JP2011/003289, filed on Jun. 10, 2011.

(30) Foreign Application Priority Data

Jul. 8, 2010 (JP) ................................. 2010-155534

(51) Int. Cl.
*H04B 1/38* (2006.01)
(52) U.S. Cl.
USPC .......... 375/219; 307/43; 307/80; 340/12.37
(58) Field of Classification Search
None
See application file for complete search history.

(56) References Cited

U.S. PATENT DOCUMENTS

2007/0177313 A1    8/2007  Sumita
2009/0033155 A1*   2/2009  Kanno et al. ................... 307/80
2009/0100273 A1*   4/2009  Miller ........................... 713/193

FOREIGN PATENT DOCUMENTS

| JP | 2004-228104 | * | 8/2004 |
| JP | 2004-228104 A | | 8/2004 |
| JP | 2007-201455 A | | 8/2007 |
| JP | 2009-016776 A | | 1/2009 |

OTHER PUBLICATIONS

"LM5005—High Voltage 2.5 Amp Buck Regulator" National Semiconductor, pp. 1-21 (Mar. 2006).
"LP5552 PWI 2.0 and PowerWise® Technology Compliant Energy Management Unit" Texas Instruments, Literature Number: SNVS474D, pp. 1-35 (May 20, 2008).
"LP5553 PowerWise® AVS Energy Management Unit with SPMI" Texas Instruments, 41 pages (Revised Mar. 2009).
International Search Report mailed Sep. 13, 2011 issued in corresponding International Application No. PCT/JP2011/003289.

* cited by examiner

*Primary Examiner* — Adolf Dsouza
(74) *Attorney, Agent, or Firm* — McDermott Will & Emery LLP

(57) ABSTRACT

A semiconductor integrated circuit which operates based on a power supply voltage output from a power supply device configured to generate a voltage of a magnitude in accordance with an analog control signal includes: a first terminal to which the power supply voltage is applied; an internal interconnect which is connected to the first terminal, and distributes the power supply voltage to sections in the semiconductor integrated circuit; and a second terminal from which the analog control signal is output. The analog control signal is generated to have a magnitude in accordance with a potential of the internal interconnect.

19 Claims, 21 Drawing Sheets

SEMICONDUCTOR INTEGRATED CIRCUIT AND ELECTRONIC APPARATUS PROVIDED WITH SAME

CROSS-REFERENCE TO RELATED APPLICATION

This is a continuation of International Application No. PCT/JP2011/003289 filed on Jun. 10, 2011, which claims priority to Japanese Patent Application No. 2010-155534 filed on Jul. 8, 2010. The entire disclosures of these applications are incorporated by reference herein.

BACKGROUND

The present disclosure relates to power supply control systems, and specifically to power supply control in an electronic apparatus including a power supply device, and a semiconductor integrated circuit which operates based on an output voltage of the power supply device.

FIG. 22 illustrates an application circuit described in LM5005—High Voltage 2.5 Amp Buck Regulator, Datasheet, [online], National Semiconductor, March 2006, [retrieved on 2011 Apr. 28], Retrieved from the Internet: <URL: http://www.alldatasheet.com/datasheet-pdf/pdf/180844/NSC/LM5005.html>. In this power supply system, a smoothing coil 2203, a smoothing capacitor 2204, and a resistive voltage divider circuit 2205 which are mounted on substrates are connected to a power supply output terminal 2202 of a power supply IC 2201. Moreover, a power supply terminal 2208 of a system-on-a-chip (SoC) section 2207 is connected to a node 2206 to which the resistive voltage divider circuit 2205 is connected, thereby supplying a power supply voltage to the SoC section 2207. The power supply IC 2201 mainly composed of analog circuits generates an output voltage of a magnitude in accordance with a voltage VFB obtained by dividing an output voltage by the resistive voltage divider circuit 2205, and the SoC section 2207 operates in response to the output voltage as the power supply voltage received as a reference. In this type of electronic apparatus, the resistive voltage divider circuit 2205 includes a fixed resistor, and the divided voltage ratio is fixed, so that it is not possible to dynamically control a set output voltage. Moreover, accuracy of the power supply voltage is ensured only when the resistive voltage divider circuit 2205 is disposed in the immediate vicinity of the power supply IC 2201, and the power supply voltage is measured at the node 2206 near the power supply IC 2201. Thus, impedance of a power supply interconnect extending from the power supply IC 2201 to the SoC section 2207 or accuracy of components such as a resistive element of the resistive voltage divider circuit 2205 may cause variations in the power supply voltage of the SoC section 2207. As a result, the performance of the SoC section 2207 significantly depends on accuracy of the power supply potential of the power supply system. Thus, there has been demand to dynamically and accurately control the power supply voltage of the SoC section 2207 in accordance with the accuracy of the components and the impedance of the power supply interconnect.

FIG. 23 illustrates a configuration of a system described in LP5552—PWI 2.0 and PowerWise Technology Compliant Energy Management Unit, Datasheet, [online], National Semiconductor, May 20, 2008, [retrieved on 2011 Apr. 28], Retrieved from the Internet: <URL: http://www.alldatasheet-net/datasheet-pdf/pdf/239791/NSC/LP5552.html>. This power supply system has a configuration as an electronic apparatus capable of dynamically and accurately controlling a power supply voltage. A power supply IC 2301 has a power management (PM) function by which the power supply voltage can be dynamically controlled. Moreover, a SoC section 2302 includes a performance monitor circuit (HPM) 2303 configured to monitor characteristics such as circuit delay. The power supply IC 2301 for PM includes a digital control circuit 2305 in which a digital feedback signal 2304 output from the SoC section 2302 is digitally processed. A signal 2306 obtained after the digital processing in the digital control circuit 2305 is converted to an analog signal 2307 by a built-in D/A converter (DAC) circuit, and is controlled so that an output voltage 2308 is a voltage according to demanded performance of the SoC section 2302. Based on a result of the monitoring by the performance monitor circuit 2303, the SoC section 2302 determines a voltage value necessary for normal circuit operation of the SoC section 2302, and outputs the voltage value as the digital feedback signal 2304 to the power supply IC 2301 for the PM. With this power supply system, the output voltage 2308 can be controlled so that Vdd is in the range from about 0.6 V to about 1.2 V.

Japanese Patent Publication No. 2007-201455 proposes that a digital signal processing operation of a power supply voltage and a substrate voltage which minimize power of a power supply circuit (regulator) and a SoC section is performed, and a resistance value in a resistive voltage divider circuit of the regulator is changed to vary a reference voltage so that the power supply voltage has a desired power supply voltage value, thereby reducing power of a system.

SUMMARY

The improved electronic apparatuses described above are only capable of performing discrete voltage control according to a bit width of a digital signal in accordance with the demanded performance of the SoC section 2302, and thus a variable step width of the power supply voltage supplied to the SoC section 2302 is necessarily large. Increasing the number of bits of the digital signal according to the demanded performance of the SoC section 2302 reduces a step width of voltage control, but increases sizes of a logic control circuit for performing digital processing, a DAC circuit for converting a digital signal from the logic control circuit to an analog signal, etc. which are built in the power supply IC 2301, thereby increasing cost.

The present disclosure provides a power supply control system capable of performing dynamic and high-resolution voltage control with a relatively simple configuration.

A semiconductor integrated circuit which operates based on a power supply voltage output from a power supply device configured to generate a voltage of a magnitude in accordance with an analog control signal includes: a first terminal to which the power supply voltage is applied; an internal interconnect connected to the first terminal to distribute the power supply voltage to sections in the semiconductor integrated circuit; and a second terminal from which the analog control signal is output, wherein the analog control signal is generated to have a magnitude in accordance with a potential of the internal interconnect.

With this configuration, based on an internal voltage of the semiconductor integrated circuit, feedback control of the power supply device is performed by the analog control signal, so that it is possible to perform dynamic and high-resolution voltage control. Moreover, a circuit configuration is relatively simple due to analog control.

For example, the semiconductor integrated circuit may include: a potential monitor circuit configured to detect the potential of the internal interconnect; and a potential control circuit configured to generate the analog control signal having a magnitude in accordance with the potential detected by the potential monitor circuit.

Moreover, the semiconductor integrated circuit may include: a circuit block capable of being switched between a plurality of operation modes different in load, wherein before the circuit block is switched between the operation modes, the potential control circuit generates the analog control signal having a magnitude in accordance with an operation mode to which the circuit block will be switched.

With this configuration, for example, when the circuit block will transition to, for example, a loaded state in which a high load is applied to the circuit block, an output voltage can be increased before the circuit block transitions to the loaded state. Thus, after the circuit block is switched between the operation modes, it is immediately possible to drive the circuit block under the high load.

Alternatively, the semiconductor integrated circuit may include: a first IO circuit connected to the first terminal; and a second IO circuit connected to the second terminal, wherein the first and second IO circuits are electrically isolated from each other.

For example, it is possible to configure an electronic apparatus, including: the above-described semiconductor integrated circuit; and a power supply device configured to generate a power supply voltage of a magnitude in accordance with the analog control signal output from the semiconductor integrated circuit, and supply the generated power supply voltage to the semiconductor integrated circuit.

Preferably, in the above-described electronic apparatus, an interconnect through which the analog control signal is transmitted from the semiconductor integrated circuit to the power supply device may be shielded. With this configuration, it is possible to improve noise resistance characteristics of the analog control signal.

Alternatively, a semiconductor integrated circuit which operates based on a power supply voltage output from a power supply device configured to generate a voltage of a magnitude in accordance with a control signal having three or more voltage values may include: a first terminal to which the power supply voltage is applied; an internal interconnect which is connected to the first terminal, and distributes the power supply voltage to sections in the semiconductor integrated circuit; and a second terminal from which the control signal is output, wherein the control signal is generated to have a magnitude in accordance with a potential of the internal interconnect.

According to the present disclosure, it is possible to obtain a power supply control system capable of performing dynamic and high-resolution voltage control with a relatively simple configuration.

DETAILED DESCRIPTION

First Embodiment

Figure 1:
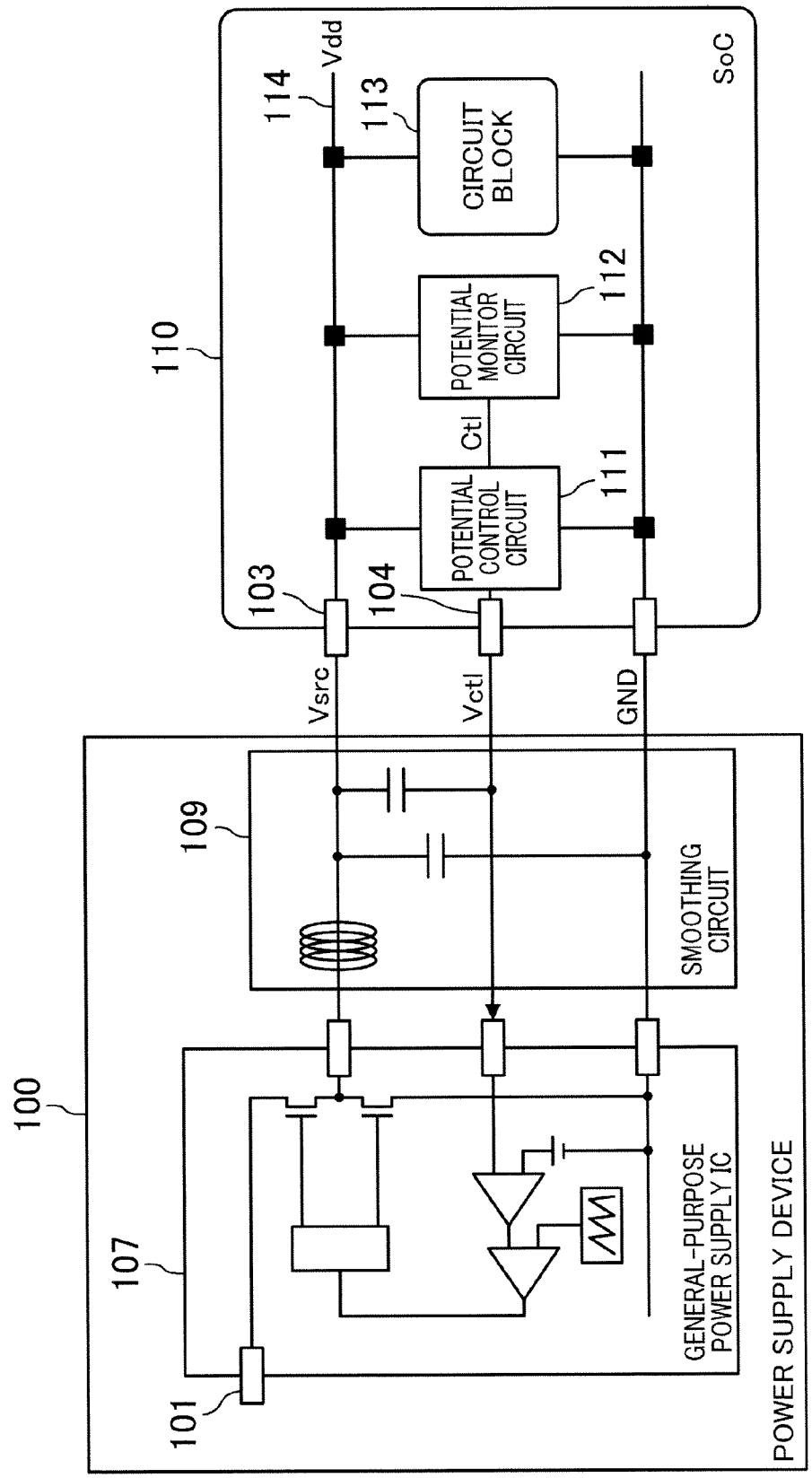
FIG. 1 is a block diagram illustrating a configuration of an electronic apparatus according to a first embodiment.

FIG. 1 is a block diagram illustrating a configuration of an electronic apparatus according to a first embodiment. The electronic apparatus includes a power supply device 100 and a SoC section 110. The power supply device 100 receives a continuously varying analog control signal (Vctl) as a feedback signal from the SoC section 110, and generates a power supply voltage (Vsrc) of a magnitude in accordance with the Vctl. For example, the power supply device 100 includes a general-purpose power supply IC 107 and a smoothing circuit 109 formed on a PCB substrate. The general-purpose power supply IC 107 can be, for example, a step-down switching regulator IC. Note that the general-purpose power supply IC 107 may be a power supply IC other than the step-down switching regulator IC. The general-purpose power supply IC 107 performs switching control of a switching element at a duty ratio according to the Vctl, and generates a square wave voltage. The smoothing circuit 109 smoothes the square wave voltage, so that an input voltage which is input from a power supply terminal 101, and is, for example, about 5 V is reduced to about 1.2 V, thereby generating the Vsrc.

The SoC section 110 operates in response to the Vsrc received at a terminal 103. Moreover, the SoC section 110 generates a Vctl of a magnitude in accordance with a potential (Vdd) of a power supply interconnect 114 configured to distribute the Vsrc, and outputs the Vctl from a terminal 104. For example, the SoC section 110 includes a potential monitor circuit 112 configured to monitor the Vdd, a potential control circuit 111 configured to generate the Vctl, and a circuit block 113 configured to operate in response to receiving the Vdd.

The circuit block 113 may include a single logic circuit element, a plurality of logic circuit elements, a single device, or a plurality of devices.

The potential monitor circuit 112 detects the Vdd to generate a control signal (Ctl). The potential control circuit 111 generates a Vctl of a magnitude in accordance with the Ctl.

Figure 2:
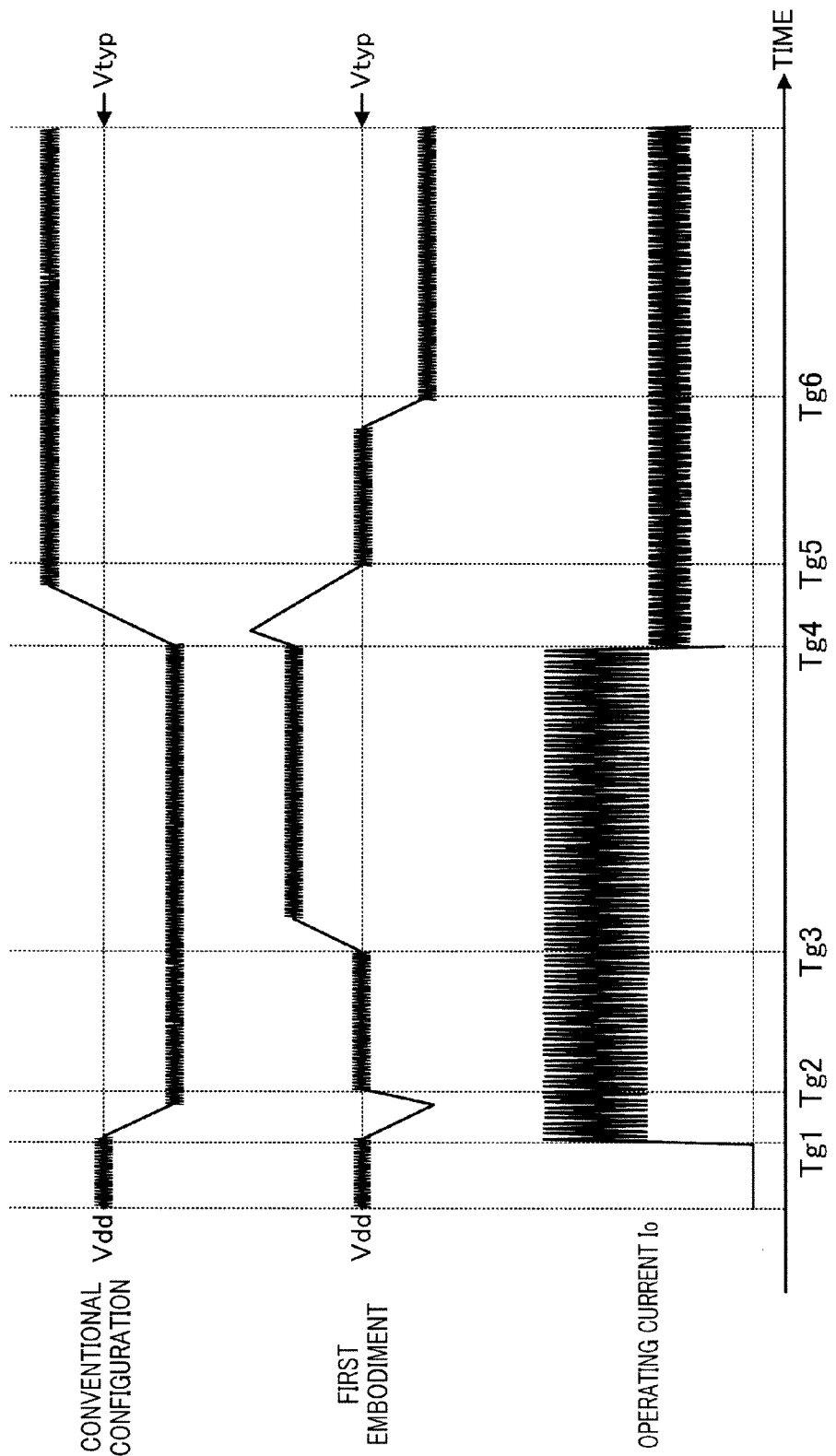
FIG. 2 is a waveform diagram illustrating voltage control by the electronic apparatus of FIG. 1.

FIG. 2 is a waveform diagram illustrating examples of voltage control of a conventional configuration and the present embodiment. The waveform diagram schematically shows how the voltage control is performed in the conventional configuration and the present embodiment in accordance with an operating current Io flowing through the circuit block. Here, the term "conventional configuration" refers to a configuration in which a feedback signal is generated based on a power supply voltage outside a SoC section. In the conventional configuration, when the current Io is large, the internal voltage (Vdd) of the SoC section decreases at time Tg1. In contrast, when the current Io is small, the Vdd increases at time Tg4. In general, specifications of power supply ICs define voltage accuracy inclusive of the variation range of the Vdd.

In contrast, in the present embodiment, the Vctl is generated in accordance with the Vdd, which depends on parasitic impedance of the power supply interconnect 114, and the Vsrc and the Vdd are controlled by the Vctl. When the current Io increases at the time Tg1, and the Vdd decreases, the potential monitor circuit 112 increases a control value of the Ctl. Thus, the Vdd returns to a typical voltage value Vtyp at time Tg2. When the current Io remains large, the potential monitor circuit 112 further increases the control value of the Ctl. This increases the Vdd after time Tg3, so that the circuit block 113 to which a high load is applied can be driven. On the other hand, when the current Io decreases at the time Tg4, the potential monitor circuit 112 reduces the control value of the Ctl. Thus, the Vdd reaches the Vtyp at time Tg5. After that, when the current Io remains small, the potential monitor circuit 112 further reduces the control value of the Ctl. Thus, the Vdd decreases below the Vtyp at time Tg6. Thus, the power is further reduced.

As described above, the present embodiment allows feedback correction inclusive of the internal voltage (Vdd) of the SoC section 110, and thus it is possible to dynamically control the Vsrc. Thus, it is possible to increase operation speed and reduce power of the SoC section 110. In particular, in the case of the digital control as the conventional configuration, power consumption is relatively large because a digital signal has to be serially transferred by a clock signal, or the like. In contrast, since analog control is performed in the present embodiment, power consumption is relatively small, and the resolution of the voltage control can be decreased, for example, below 1 mV, so that a highly efficient electronic apparatus can be obtained. Moreover, general-purpose power supply ICs can be used at a relatively low cost, so that it is possible to reduce the cost of the electronic apparatus. Moreover, generating the Vctl by the SoC section 110 can reduce the circuit area of the power supply device 100 compared to the conventional configuration in which a voltage control function is integrated into a power supply IC whose process size is difficult to be reduced.

Note that various characteristics are monitored by, for example, a sensor circuit for sensing an operation error, a sensor circuit for sensing a noise margin, a temperature sensor circuit, a sensor circuit for sensing a finished quality of a device, a sensor circuit for sensing cross-talk noise, a sensor circuit for sensing latch up, a sensor circuit for sensing reliability degradation, a sensor circuit for sensing EM resistance, a sensor circuit for sensing delay characteristics, a sensor circuit for sensing a breakdown voltage, etc. in addition to the potential monitor circuit 112, and the various characteristics can be fed back to the power supply device 100 as a feedback voltage. In particular, highly sensitive characteristics of a power supply voltage are monitored, and based on the monitored characteristics, the power supply voltage is controlled, so that the performance of the SoC section 110 can be improved.

Figure 3:
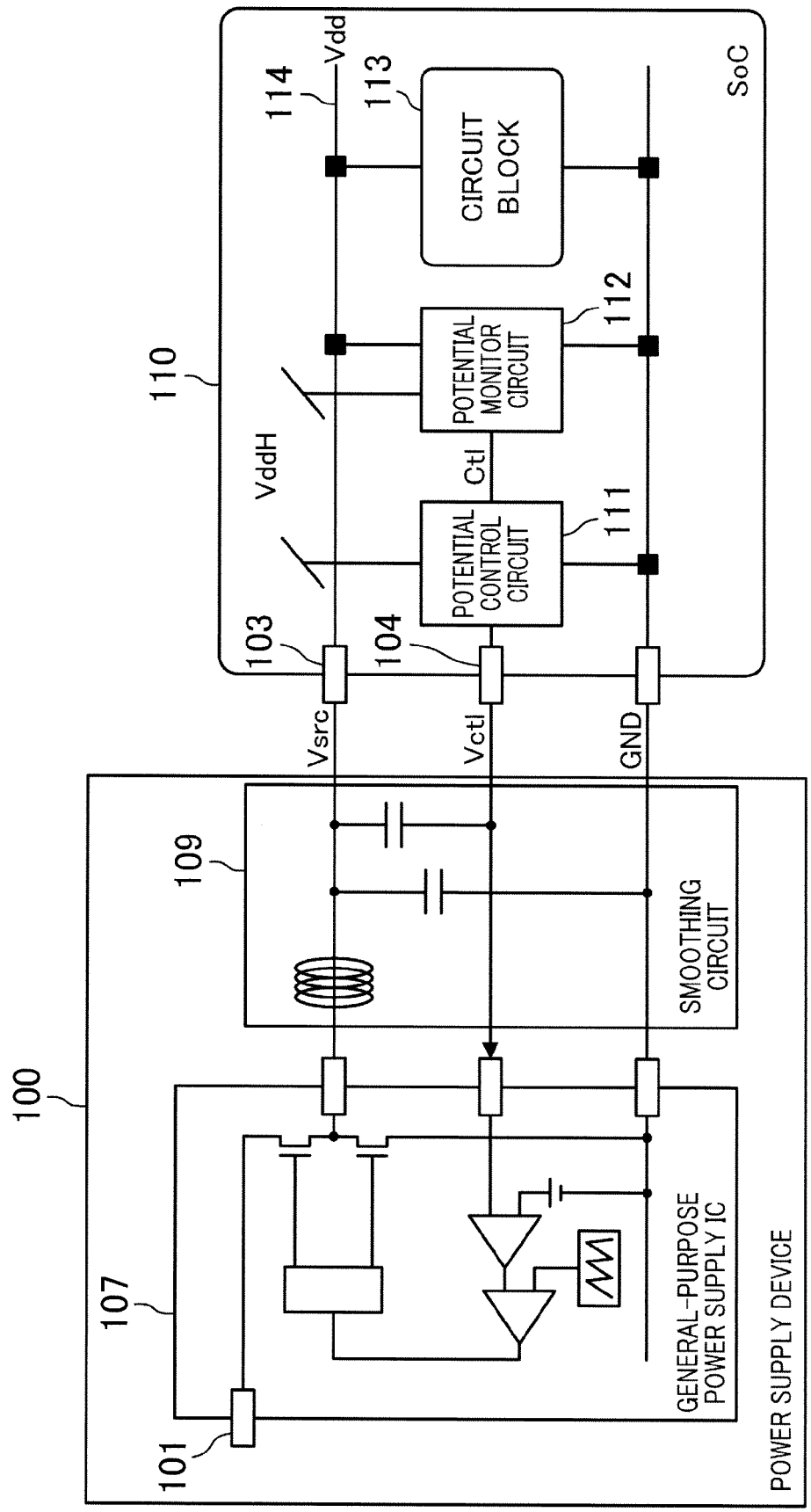
FIG. 3 is a block diagram illustrating another configuration of the electronic apparatus of FIG. 1.

Moreover, the potential monitor circuit 112 may include a MOS-PET supplied with a power supply voltage (VddH) which is higher than the potential (Vdd) of the power supply interconnect 114 (see FIG. 3). The MOS-FET has a higher breakdown voltage than a MOS-FET supplied with the Vdd. Note that the VddH is, for example, 1.8 V, 2.5 V, or 3.3 V. The power supply voltage (VddH) may be connected to the potential control circuit 111. Moreover, the potential control circuit 111 includes an analog circuit configured to operate in response to receiving the power supply voltage (VddH). Any one of the potential monitor circuit 112 and the potential control circuit 111 may be connected to the power supply voltage (VddH). With this configuration, it is possible to highly accurately monitor the Vdd, and a highly accurate Vctl can be generated.

Second Embodiment

Figure 4:
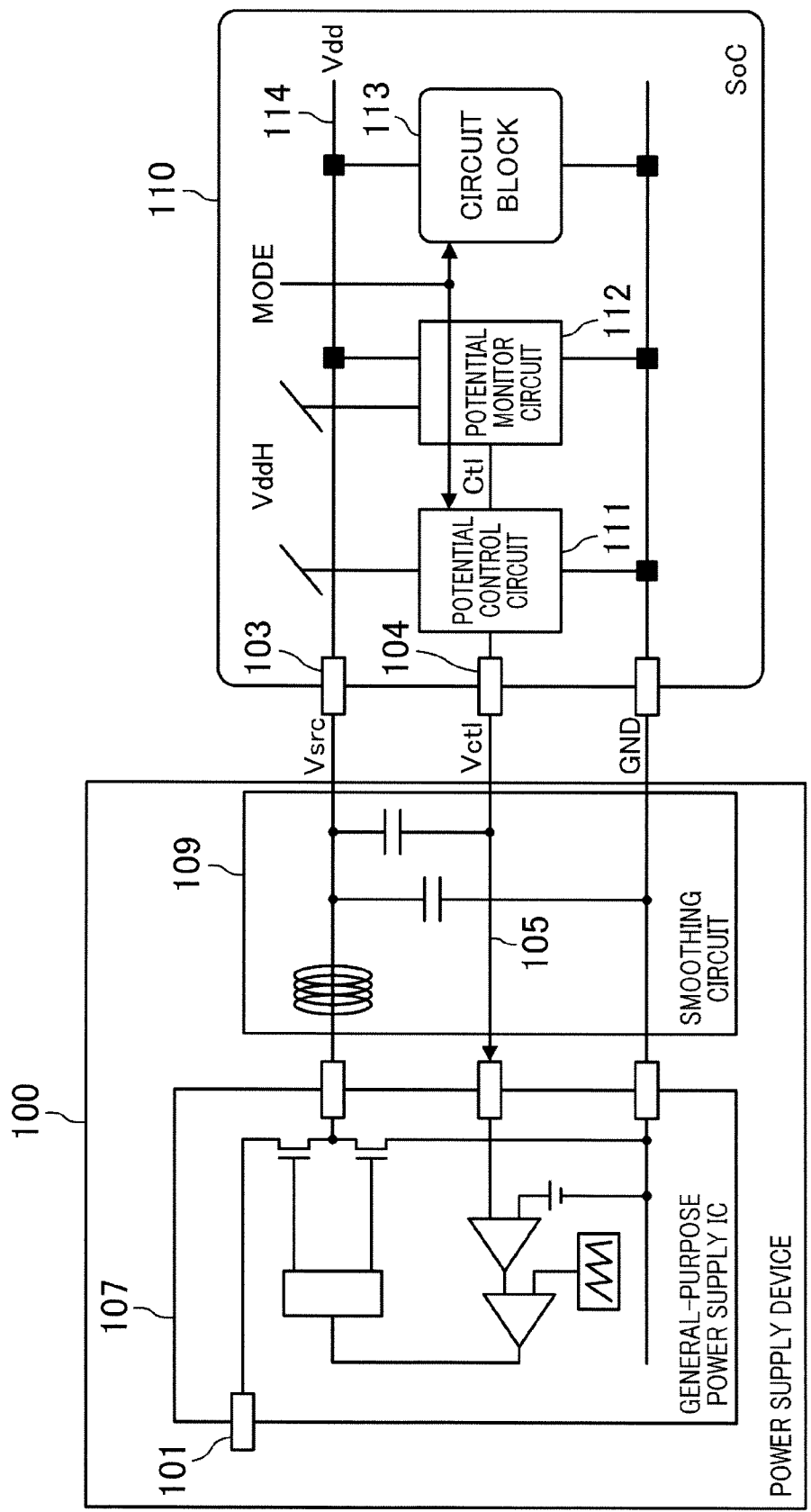
FIG. 4 is a block diagram illustrating a configuration of an electronic apparatus according to a second embodiment.

FIG. 4 is a block diagram illustrating a configuration of an electronic apparatus according to a second embodiment. A signal (MODE) is a signal representing an operation mode according to a load of a circuit block 113. In accordance with the MODE, the circuit block 113 can be switched between a plurality of operation modes which are different in load. Before the circuit block 113 is switched between the operation modes in accordance with the MODE, a potential control circuit 111 generates a Vctl of a magnitude in accordance with an operation mode to which the circuit block 113 will be switched.

Figure 5:
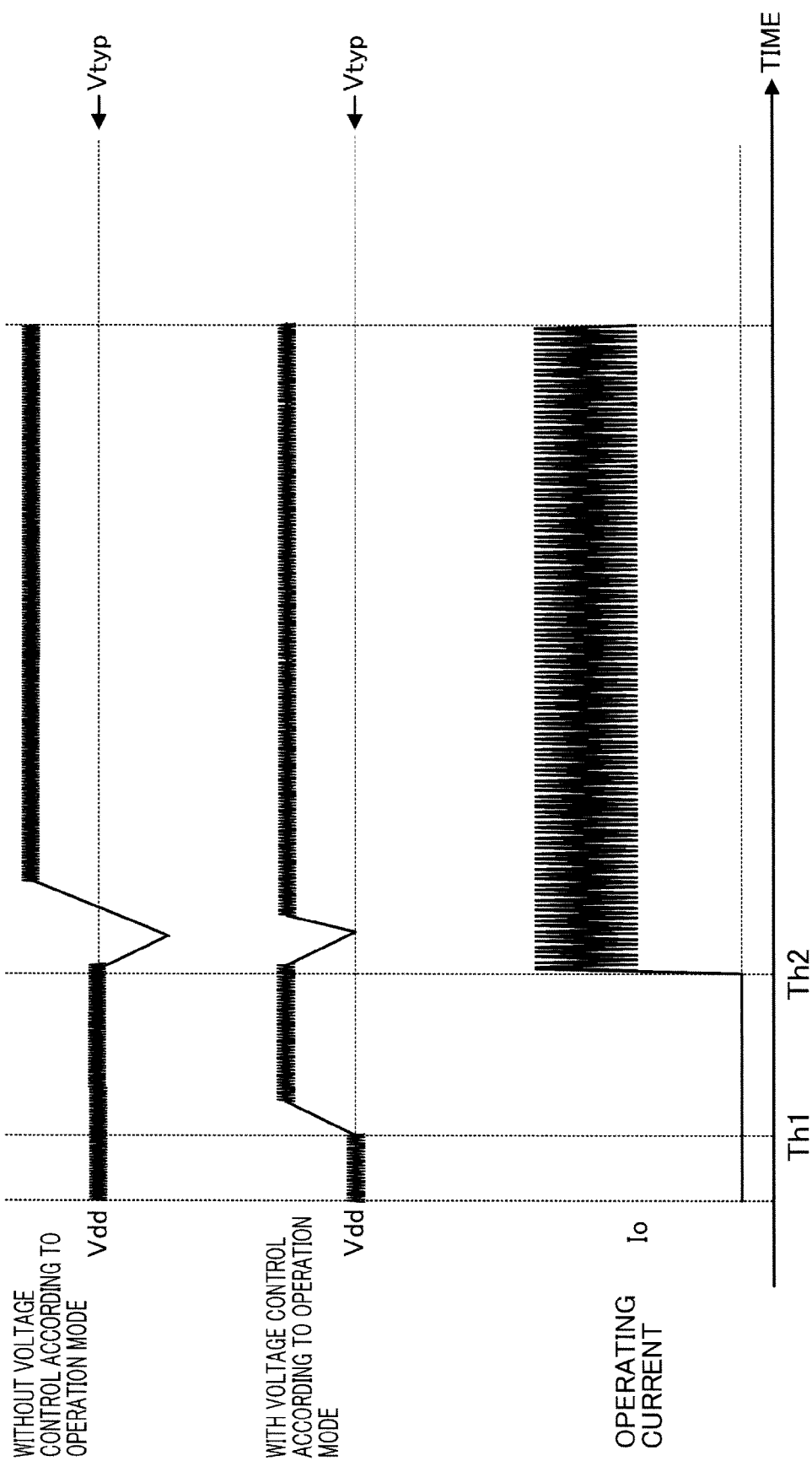
FIG. 5 is a waveform diagram illustrating voltage control by the electronic apparatus of FIG. 4.

FIG. 5 is a waveform diagram illustrating voltage control performed in consideration of the operation modes. If at time Th2, the circuit block 113 will be switched to a high-speed operation mode in which a high load is applied to the circuit block 113, the potential control circuit 111 generates a Vctl of a magnitude in accordance with the high-speed operation mode at time Th1. This increases a Vsrc, thereby increasing a Vdd. When at the time Th2, the circuit block 113 is switched to the high-speed operation mode, and a current Io increases, the Vdd decreases, but immediately afterwards, the Vdd returns to a required voltage. Note that when the circuit block 113 is in a low-load operation mode, the potential control circuit 111 may generate a Vctl of a magnitude in accordance with the low-load operation mode.

As described above, in the present embodiment, a power supply voltage in accordance with an operation mode to which the circuit block 113 will be switched is generated before the circuit block 113 is switched between the operation modes, so that it is possible to quickly respond to the change in operation mode.

Third Embodiment

Figure 6:
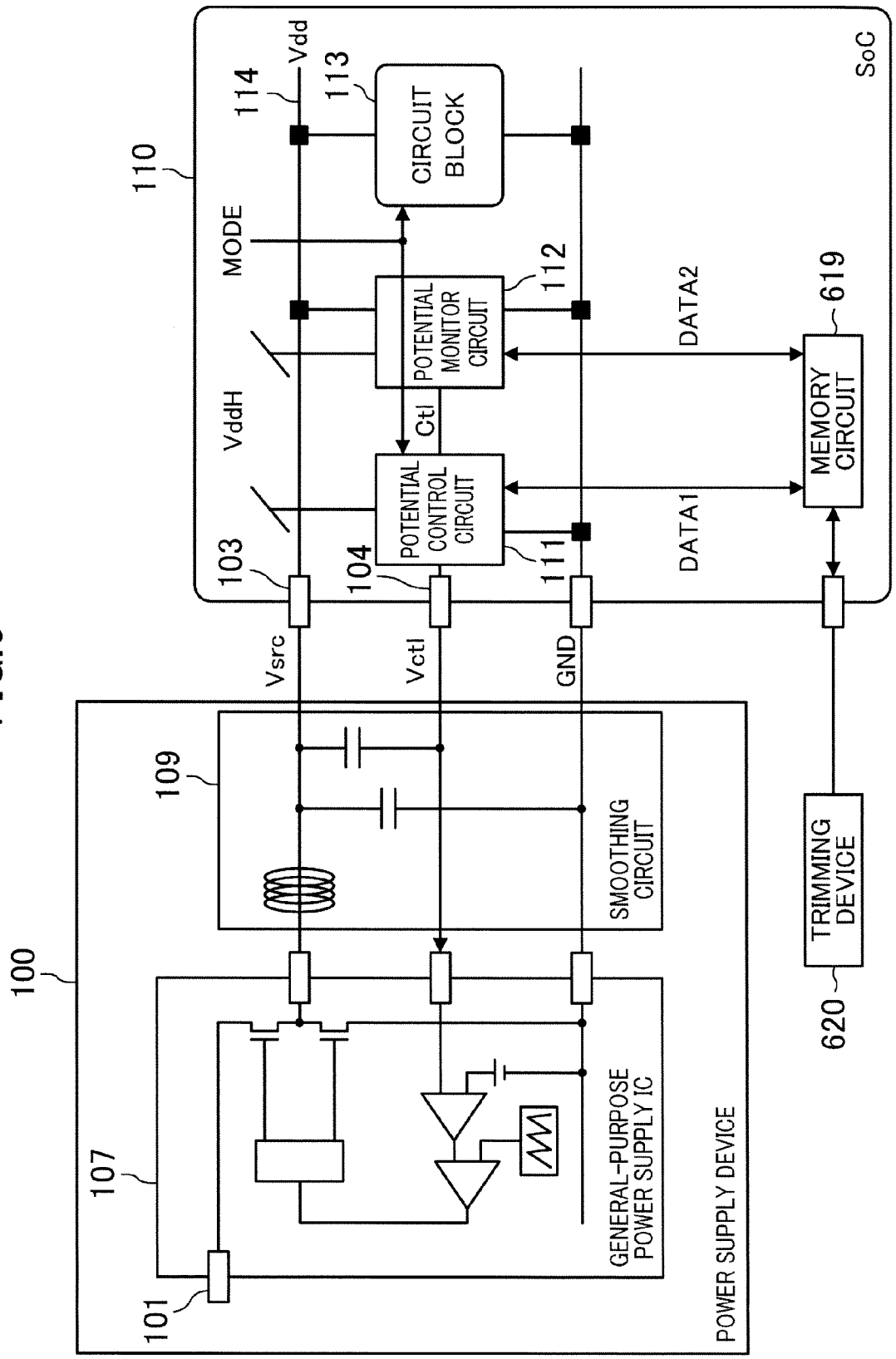
FIG. 6 is a block diagram illustrating a configuration on an electronic apparatus according to a third embodiment.

FIG. 6 is a block diagram illustrating a configuration of an electronic apparatus according to a third embodiment. A SoC section 110 includes a memory circuit 619. The memory circuit 619 stores a Vdd monitored by a potential monitor circuit 112 as a data signal (DATA2). Moreover, the memory circuit 619 stores a Vctl generated by a potential control circuit 111 as a data signal (DATA1). Note that the memory circuit 619 may store only either one of the DATA1 or the DATA2. Data stored in the memory circuit 619 is, for example, trimmed by a trimming device 620. Then, the data stored in the memory circuit 619 is reloaded into the potential monitor circuit 112 and the potential control circuit 111, and the potential control circuit 111 and the potential monitor circuit 112 respectively regenerate a Vctl and a Ctl.

As described above, according to the present embodiment, the data signals stored in the memory circuit 619 are, for example, trimmed, so that accuracy of each signal can be improved. Note that when the memory circuit 619 is a non-volatile memory, trimming, etc. is possible even after a set substrate is mounted. Moreover, the memory circuit 619 may store chip ID information, device finished characteristics and temperature information of a circuit block 113, etc.

Specific Example of Potential Control Circuit

Figure 7:
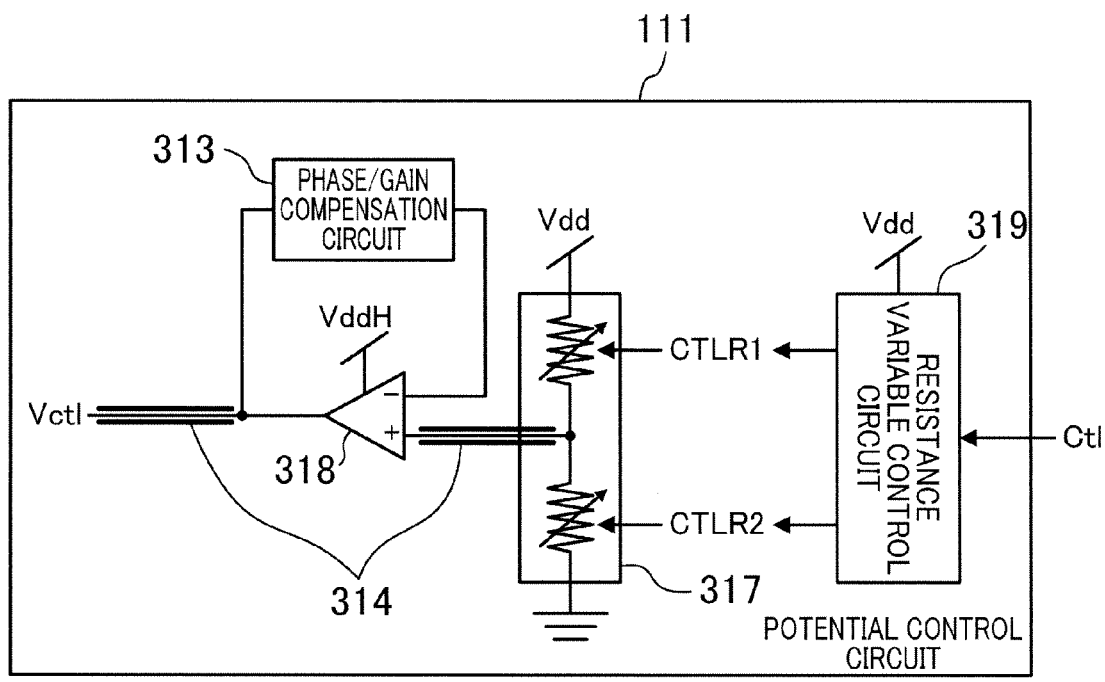
FIG. 7 is a block diagram illustrating a specific configuration of a potential control circuit.

FIG. 7 is a block diagram illustrating a specific configuration of the potential control circuit 111. The potential control circuit 111 includes an analog buffer circuit, and can be, for example, a voltage follower circuit. The analog buffer circuit includes a MOS-FET supplied with a power supply voltage (VddH). The MOS-FET has a higher breakdown voltage than a MOS-FET supplied with a power supply voltage (Vdd). For example, the potential control circuit 111 may be composed of a variable voltage divider resistor 317 and an analog buffer circuit 318. A resistance value of the variable voltage divider resistor 317 varies, for example, in accordance with control signals CTLR1, CTLR2 from a resistance-variable control circuit 319 which has received the signal (Ctl) serving as an output from the potential monitor circuit 112, and the variable voltage divider resistor 317 variably divides the power supply voltage (VddH). The analog buffer circuit 318 outputs the divided voltage as the Vctl. Note that the resistance-variable control circuit 319 not only varies control values of the control signals CTLR1, CTLR2 in accordance with the signal Ctl, but also may vary the control values of the control signals CTLR1, CTLR2 in accordance with the characteristics/performance of the circuit block 113. Note that a phase compensation circuit 313 or a gain compensation circuit 313 is preferably provided between an input and an output of the analog buffer circuit 318. Moreover, a high-impedance interconnect is preferably provided with a shield interconnect 314 having the power supply voltage Vdd, a ground potential, or the like, and extending parallel to the high-impedance interconnect.

Figure 8:
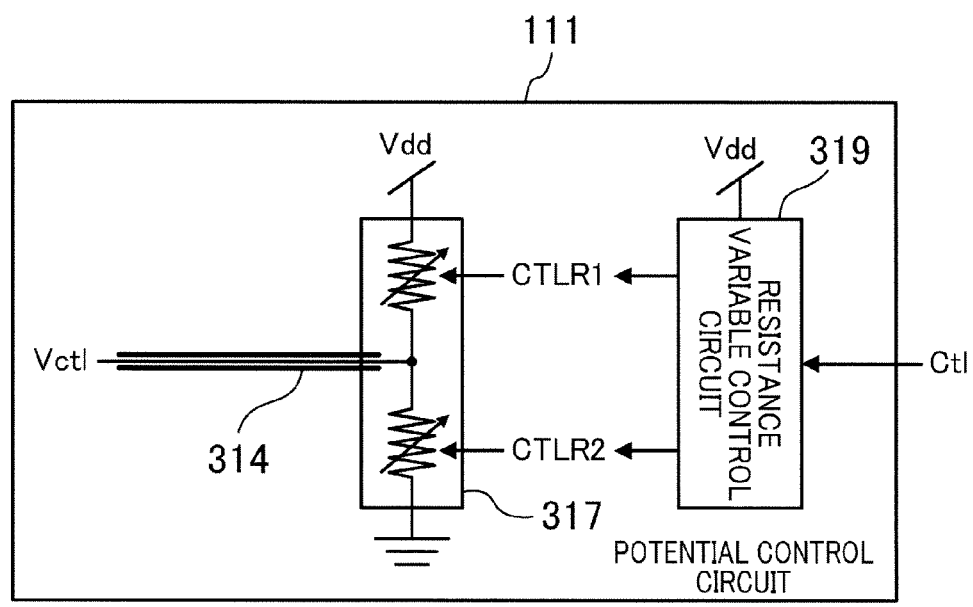
FIG. 8 is a block diagram illustrating another configuration of the potential control circuit of FIG. 7.

Moreover, as illustrated in FIG. 8, the analog buffer circuit 318 and the phase/gain compensation circuit 313 in FIG. 7 may be omitted, and a voltage at a voltage division node of the variable voltage divider resistor 317 may be directly output as the Vctl. With this configuration, it is no longer necessary to adjust the phase/gain of the analog buffer circuit 318, and thus the circuit area can be reduced.

Figure 9:
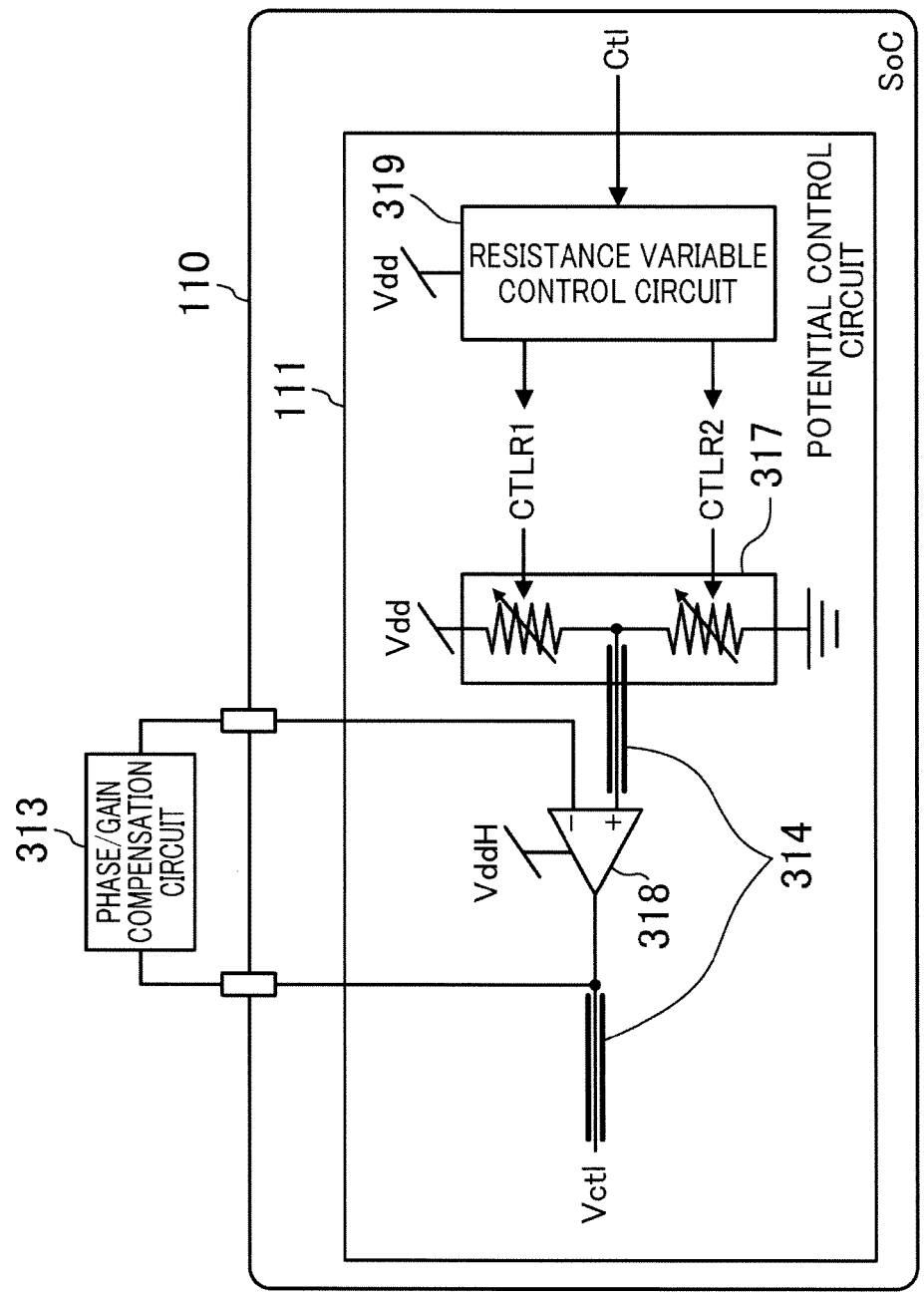
FIG. 9 is a block diagram illustrating still another configuration of the potential control circuit of FIG. 7.

Moreover, as illustrated in FIG. 9, the phase compensation circuit 313 or the gain compensation circuit 313 may be disposed outside the SoC section 110. With this configuration, it is possible to reduce the influence of noise over the divided voltage and the output of the analog buffer circuit 318, so that accuracy of the Vctl can be improved.

Fourth Embodiment

Figure 10:
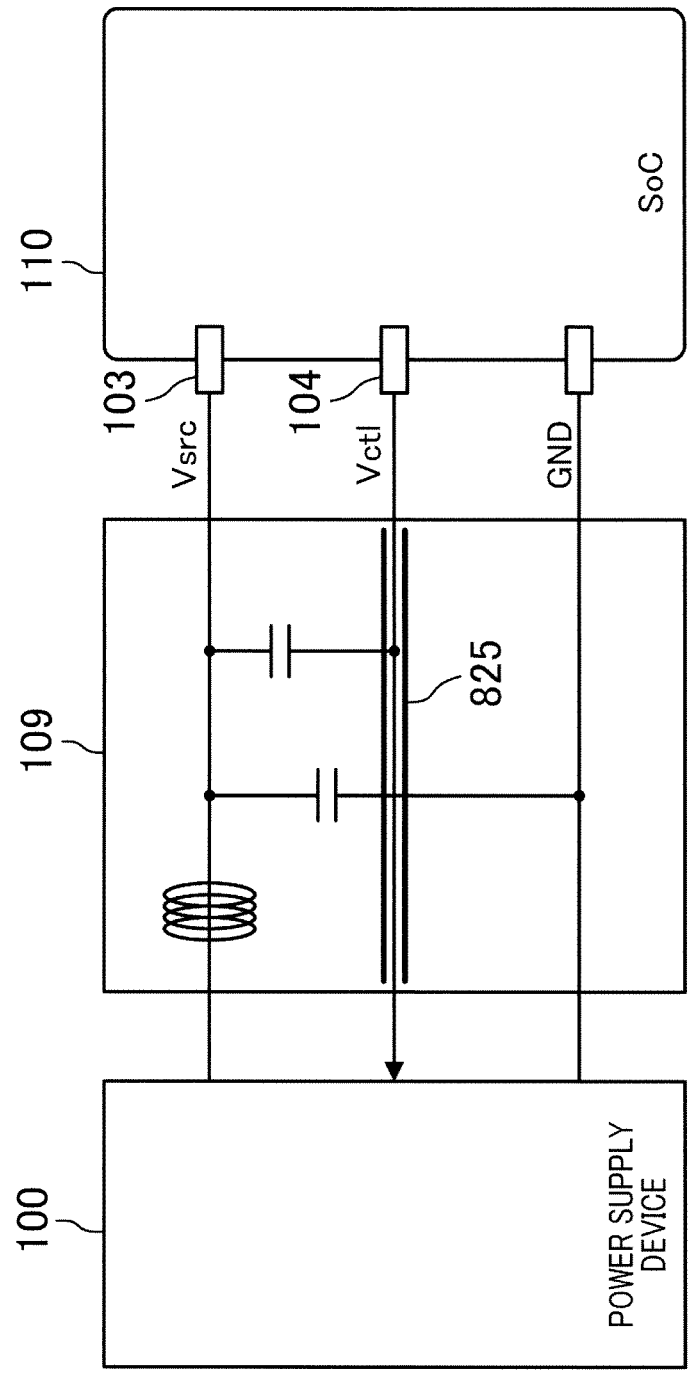
FIG. 10 is a block diagram illustrating a configuration of an electronic apparatus according to a fourth embodiment.

FIG. 10 is a block diagram illustrating a configuration of an electronic apparatus according to a fourth embodiment. On a PCB substrate 109, a shield interconnect 825 having a stable ground potential GND, or the like extends parallel to an interconnect through which a Vctl is transmitted from a SoC section 110 to a power supply device 100.

Figure 11:
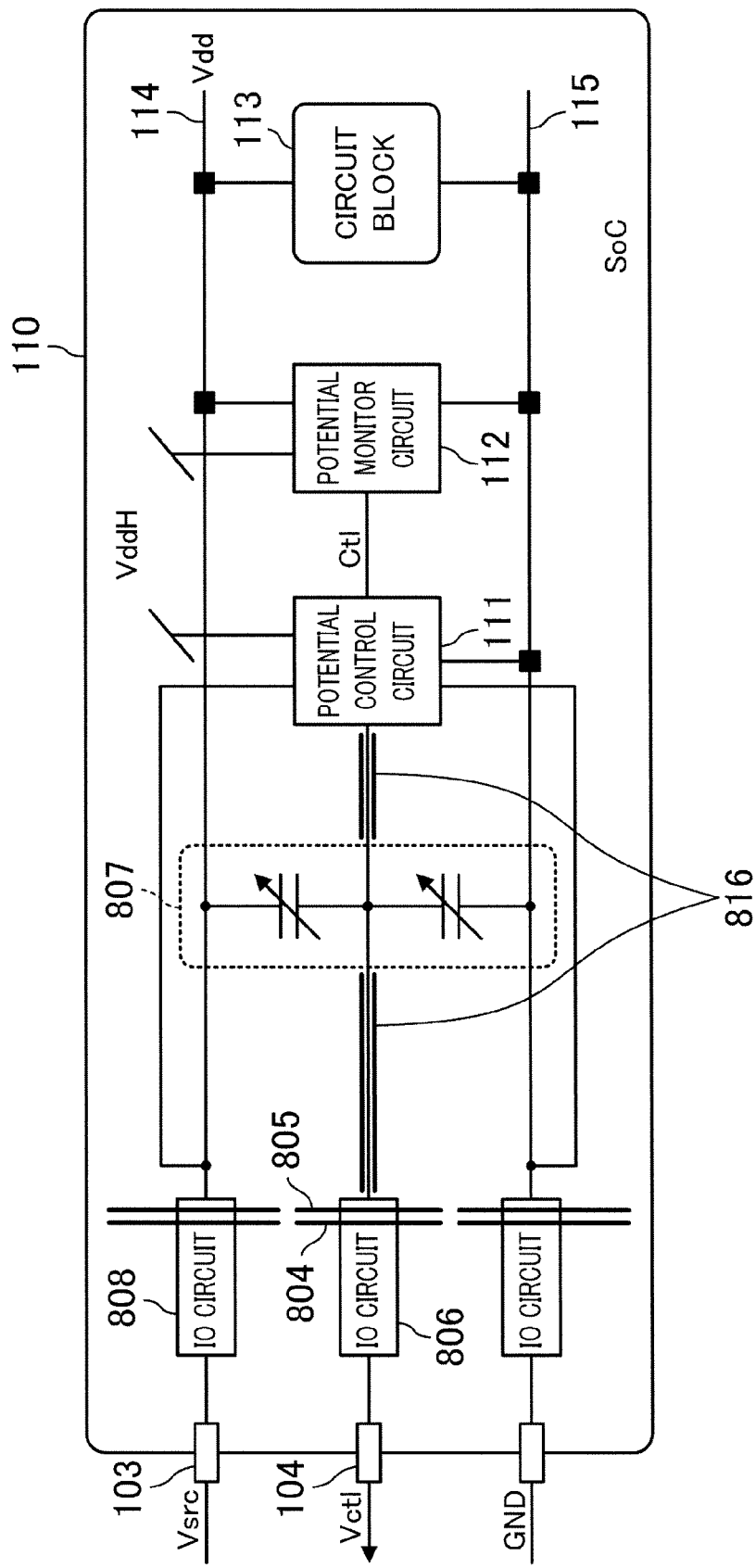
FIG. 11 is a block diagram illustrating a configuration of a SoC section according to the electronic apparatus of FIG. 10.

FIG. 11 is a block diagram illustrating a configuration of the SoC section 110 according to the present embodiment. The SoC section 110 includes an IO circuit 808 connected to a terminal 103 and an IO circuit 806 connected to a terminal 104. Power supplies 804, 805 of the IO circuit 806 are electrically isolated from other power supplies of the IO circuit 808, etc. Moreover, in the SoC section 110, a shield interconnect 816 having a ground potential, or the like extends parallel to the interconnect through which the Vctl is transmitted. A variable capacitor element 807 is connected to the interconnect through which the Vctl is transmitted, a power supply interconnect 114, and a ground interconnect 115.

As described above, according to the present embodiment, the interconnect through which the Vctl is transmitted is shielded against noise in a surrounding or outside environment, and thus allows transmission of a stable and highly accurate Vctl.

Fifth Embodiment

Figure 12:
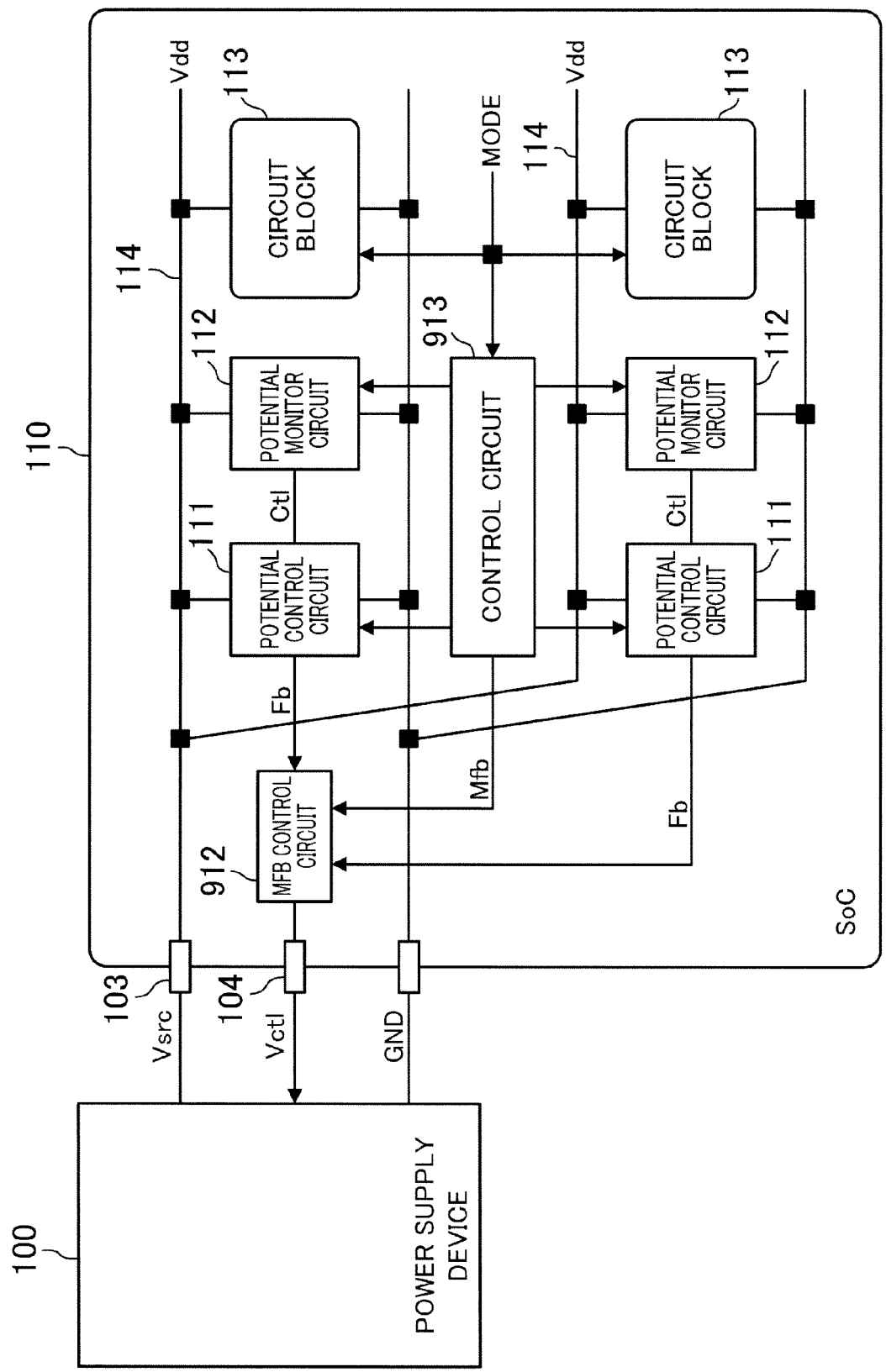
FIG. 12 is a block diagram illustrating a configuration of an electronic apparatus according to a fifth embodiment.

FIG. 12 is a block diagram illustrating a configuration of an electronic apparatus according to a fifth embodiment. A SoC section 110 has a multiblock configuration in which the number of circuit blocks 113, the number of potential monitor circuits 112, and the number of potential control circuits 111 are each, for example, two.

Specifically, each potential control circuit 111 outputs a feedback signal (Fb) which is an analog signal of a magnitude in accordance with a Ctl. A control circuit 913 generates a multi-feedback signal (Mfb) in accordance with a MODE. Moreover, the control circuit 913 instructs a MFB control circuit 912 which Fb has to be fed back to a power supply device 100 as a Vctl. The MFB control circuit 912 receives the Fbs and the Mfb, and selects one of the two Fbs in accordance with the Mfb. The MFB control circuit 912 feeds back the selected Fb as the Vctl to the power supply device 100. Thus, proper and stable voltage control is also possible in the multiblock configuration.

Sixth Embodiment

Figure 13:
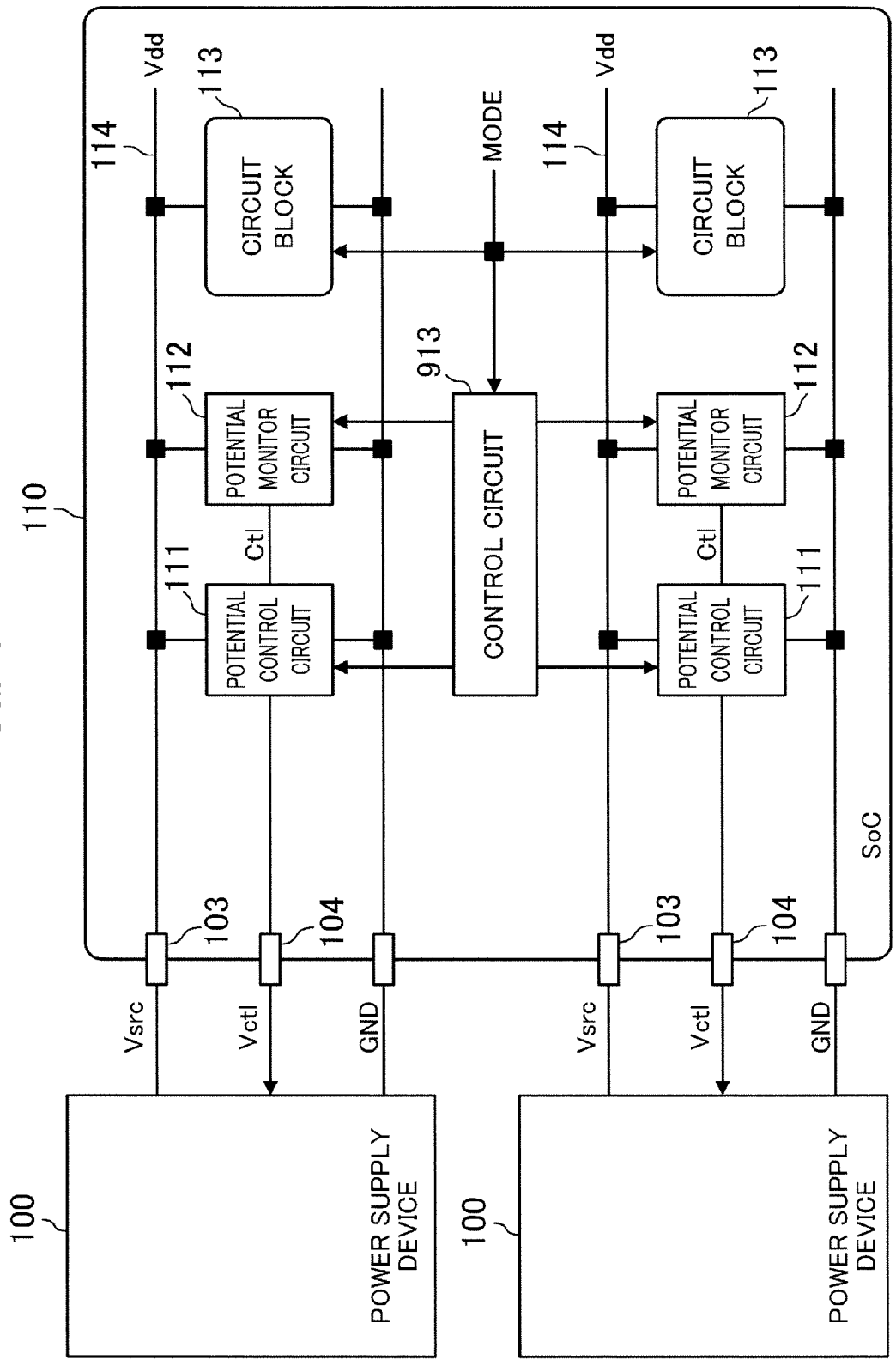
FIG. 13 is a block diagram illustrating a configuration of an electronic apparatus according to a sixth embodiment.

FIG. 13 is a block diagram illustrating a configuration of an electronic apparatus according to a sixth embodiment. A SoC section 110 has a multiblock configuration in which the number of circuit blocks 113, the number of potential monitor circuits 112, and the number of potential control circuits 111 are each, for example, two. Each circuit block 113 is supplied with Vdd according to a Vsrc from corresponding one of power supply devices 100.

When the SoC section 110 includes the plurality of circuit blocks 113 as in the present embodiment, operating voltages of the circuit blocks 113 differ from each other depending on finished quality of the device, functions of the circuit blocks 113, or the like. Thus, voltages required to operate the circuit blocks 113 are supplied from individual power supply devices 100, so that the performance of each SoC section 110 can be further improved.

Seventh Embodiment

Figure 14:
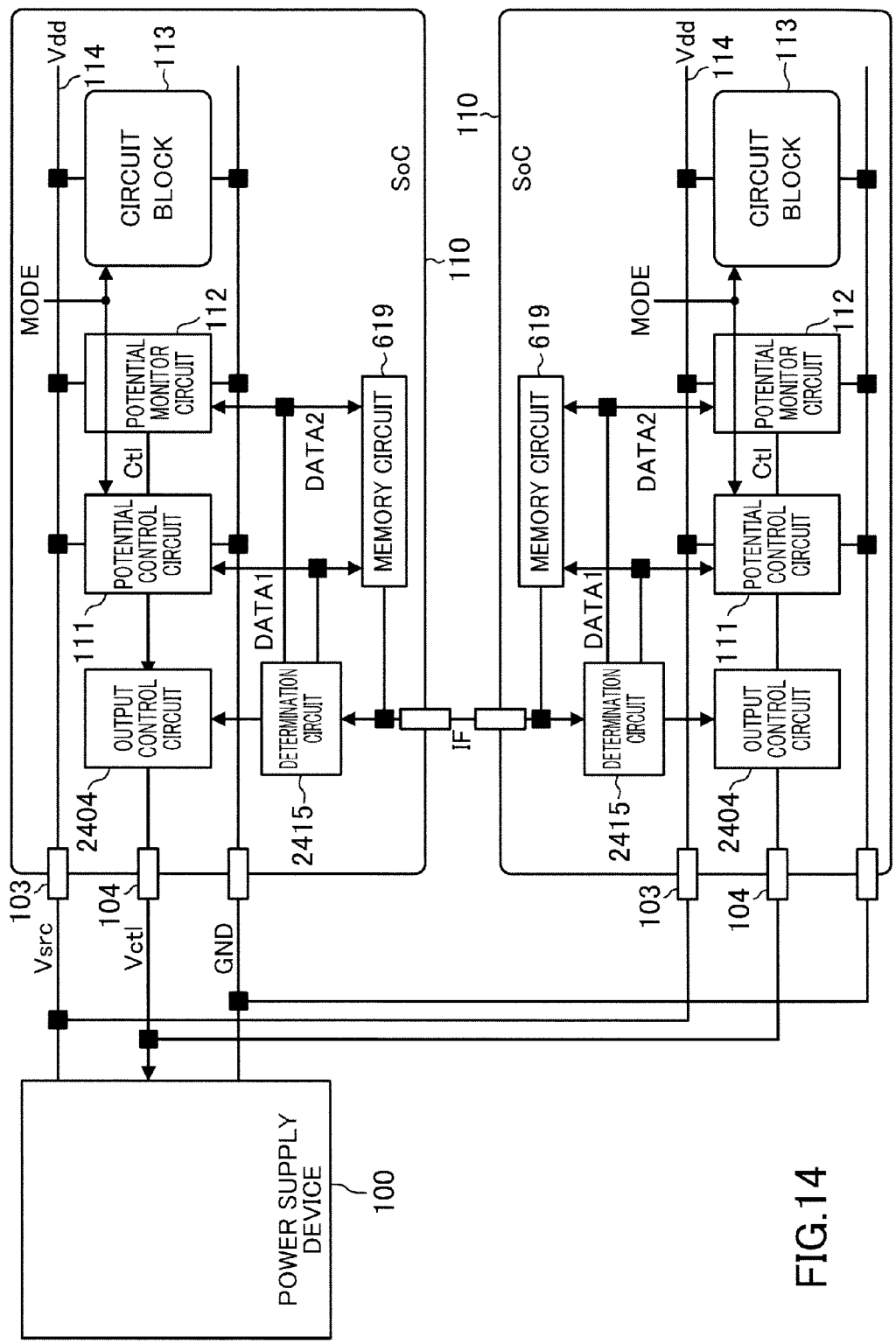
FIG. 14 is a block diagram illustrating a configuration of an electronic apparatus according to a seventh embodiment.

FIG. 14 is a block diagram illustrating a configuration of an electronic apparatus according to a seventh embodiment. A determination circuit 2415 outputs a DATA1 and a DATA2 in one SoC section 110 as a signal (IF) to a determination circuit 2415 in the other SoC section 110. The determination circuit 2415 compares the DATA1, the DATA2 in the one SoC section 110 with an IF received from the determination circuit 2415 in the other SoC section 110. Based on a result of the comparison, the determination circuit 2415 instructs an output control circuit 2404 in a Vctl generated by a potential control circuit 111 in any one of the SoC sections 110 as a signal to be fed back. For example, when the determination circuit 2415 determines that a Vctl generated by the potential control circuit 111 in the one SoC section 110 is a signal to be fed back, the determination circuit 2415 instructs the output control circuit 2404 in the one SoC section 110 to output the Vctl.

The output control circuit 2404 outputs the Vctl in accordance with the instruction by the determination circuit 2415. With this configuration, a power supply device 100 can be shared, and thus it is possible to save space in the electronic apparatus. Note that the output control circuit 2404 may be provided to any one of the SoC sections 110. In this case, in the SoC section 110 in which the output control circuit 2404 is provided, the determination circuit 2415 may instruct the output control circuit 2404 which Vctl is to be fed back.

Moreover, any one of the SoC sections 100 may include only a circuit block 113. In this case, the Vctl may be output from the other SoC section 110.

Figure 15:
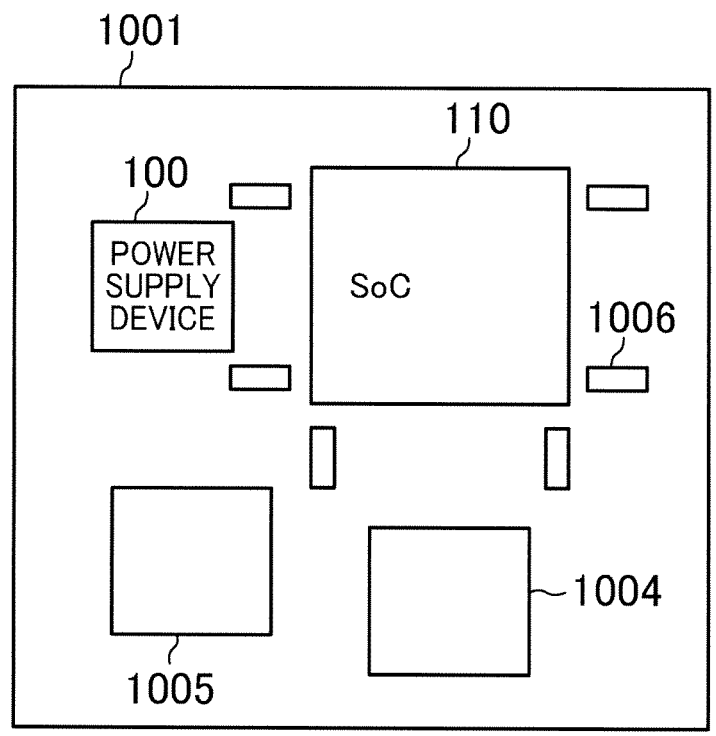
FIG. 15 is a view illustrating a SIP structure.
Figure 16:
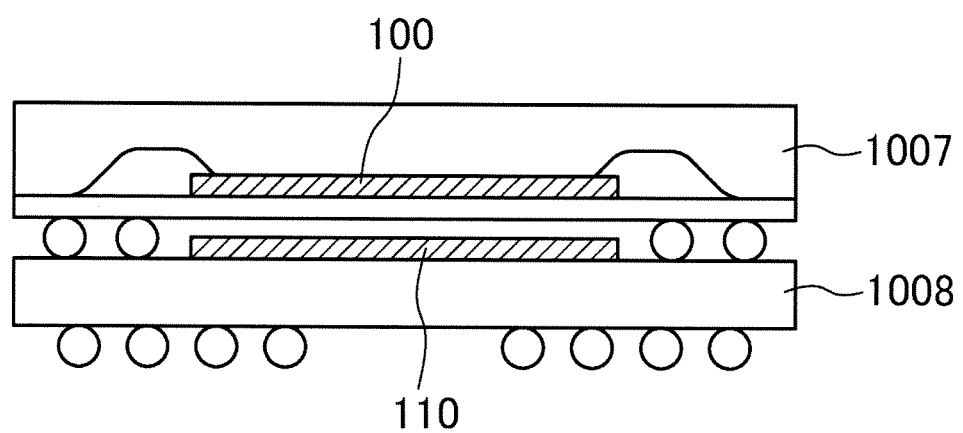
FIG. 16 is a view illustrating a PoP structure.

Note that as illustrated in FIG. 15, when the power supply device 100, the SoC section 110, the other LSIs 1004, 1005, and chip capacitors 1006 are mounted on a PCB substrate 1001, the electronic apparatus according to each of the embodiments described above can have a system-in-package (SIP) structure. Alternatively, as illustrated in FIG. 16, when the power supply device 100 is mounted on a PCB substrate 1007, and the SoC section 110 is mounted under a PCB substrate 1008, the electronic apparatus can have a package-on-package (PoP) structure. Integrating the power supply device 100 and the SoC section 110 into a package as in the case of the SIP or PoP structure facilitates design of parasitic impedance of power supply interconnects and signal interconnects.

Eighth Embodiment

Figure 17:
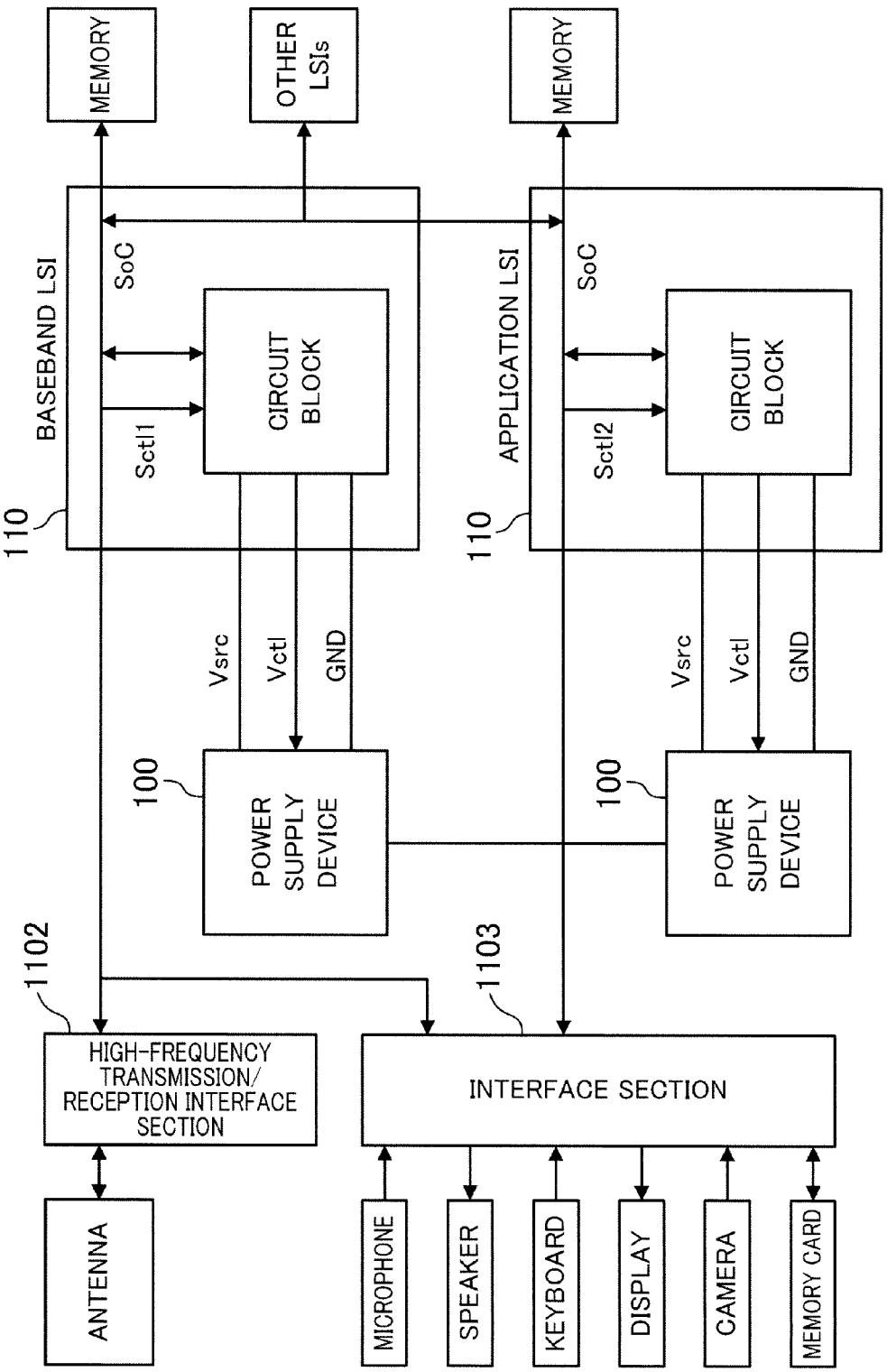
FIG. 17 is a block diagram illustrating a configuration of a communication device according to an eighth embodiment.

FIG. 17 is a block diagram illustrating a configuration of a communication device according to an eighth embodiment. The communication device is, for example, a mobile phone including power supply devices 100 and SoC sections 110. The SoC sections 110 are a baseband LSI and an application LSI. A high-frequency transmission/reception interface section 1102 converts a signal received by an antenna to a power supply control signal (Sctl1). An external input interface section 1103 converts signals input from a keyboard, and the like to a power supply control signal (Sctl2). The baseband LSI performs voltage control regularly by using a timer in the baseband LSI, or voltage control according to the Sctl1. The application LSI performs voltage control according to the Sctl2. As described above, it is also possible to increase operation speed and reduce power consumption of communication devices.

Ninth Embodiment

Figure 18:
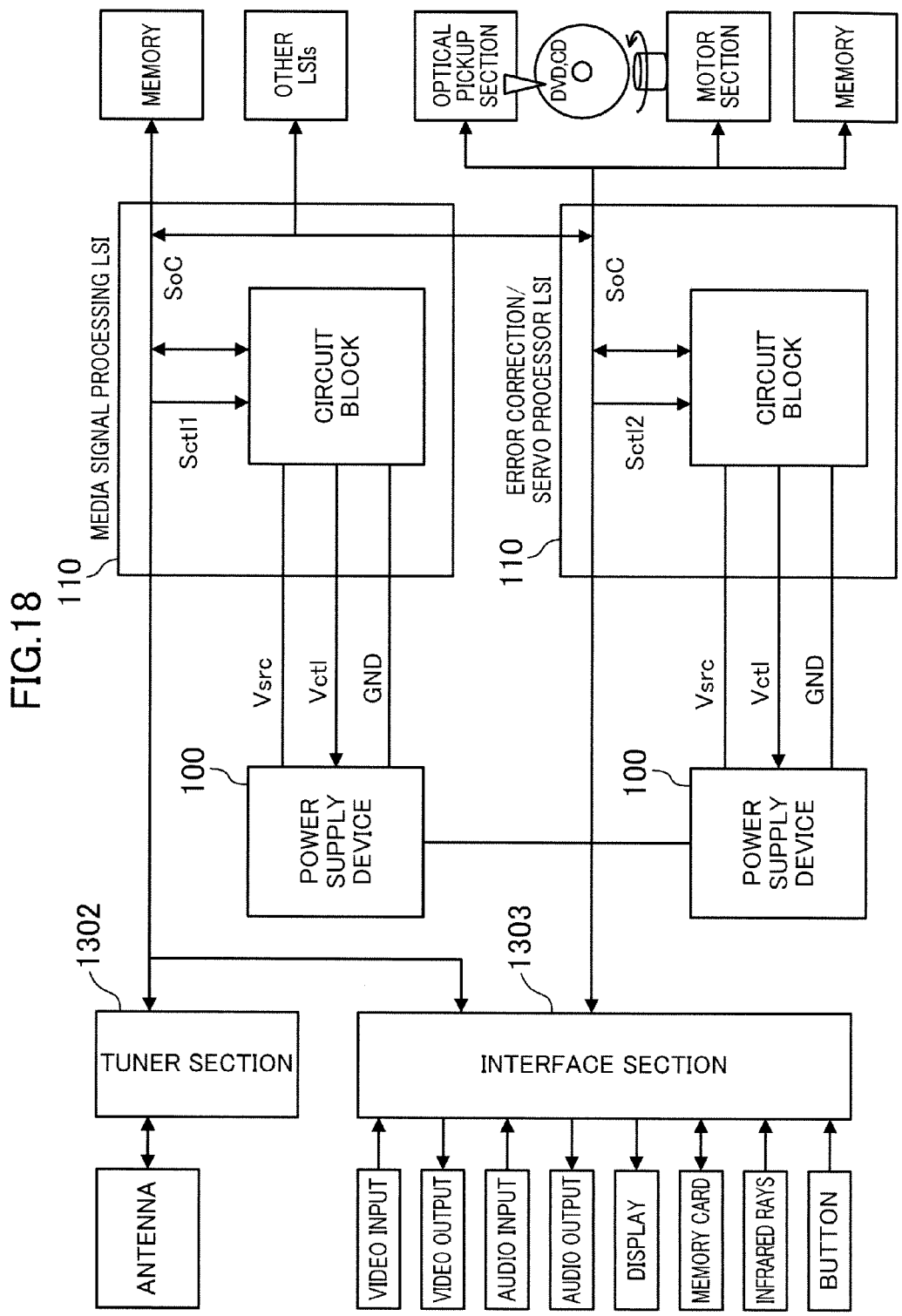
FIG. 18 is a block diagram illustrating a configuration of an AV system according to a ninth embodiment.

FIG. 18 is a block diagram illustrating a configuration of an AV system according to a ninth embodiment. The AV system is, for example, an optical disk system including power supply devices 100 and SoC sections 110. The SoC sections 110 are a media signal processing LSI configured to process a signal read from an optical disk and an error correction/servo processor LSI configured to correct an error in the signal read from the optical disk and servo control of an optical pickup.

A tuner section 1302 converts a signal received by an antenna to a power supply control signal (Sctl1). An interface section 1303 converts signals input from a video input, etc. to a power supply control signal (Sctl2). The media signal processing LSI and the error correction/servo processor LSI perform voltage control according to the Sctl1 and the Sctl2, respectively. Thus, it is also possible to increase operation speed and reduce power consumption of AV systems such as optical disk systems.

Tenth Embodiment

Figure 19:
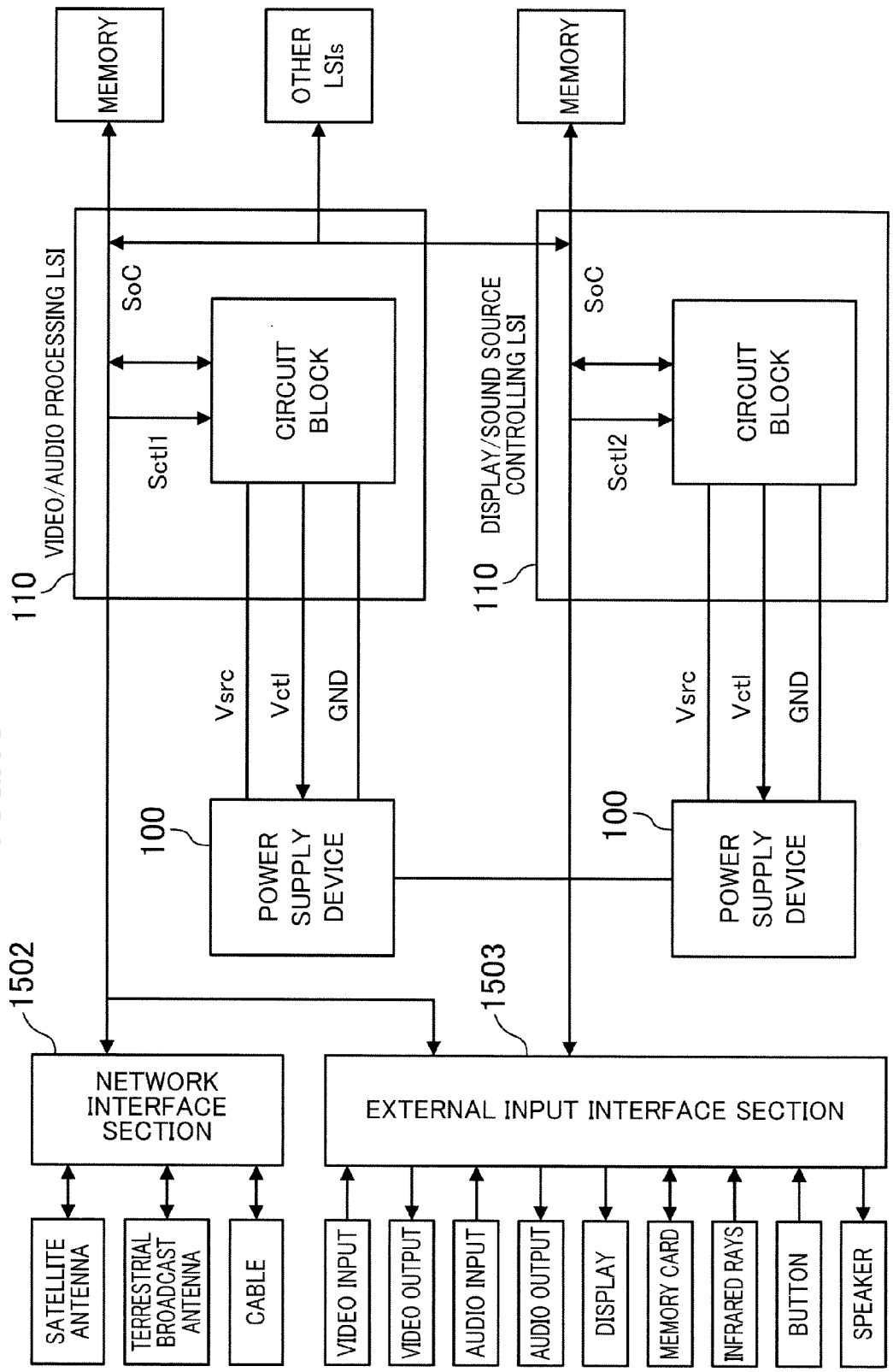
FIG. 19 is a block diagram illustrating a configuration of an AV system according to a tenth embodiment.

FIG. 19 is a block diagram illustrating a configuration of an AV system according to a tenth embodiment. The AV system is, for example, a television receiver including power supply devices 100 and SoC sections 110. The SoC sections 110 are a video/audio processing LSI configured to process video signals and audio signals and a display/sound source controlling LSI configured to control devices such as display screens, speakers, etc.

A network interface section 1502 converts signals received by an antenna, etc. to a power supply control signal (Sctl1). An interface section 1503 converts signals input from a video input, etc. to a power supply control signal (Sctl2). The video/audio processing LSI and the display/sound source controlling LSI perform voltage control according to the Sctl 1 and the Sctl2, respectively. Thus, it is also possible to increase operation speed and reduce power consumption of AV systems such as television receivers.

Eleventh Embodiment

Figure 20:
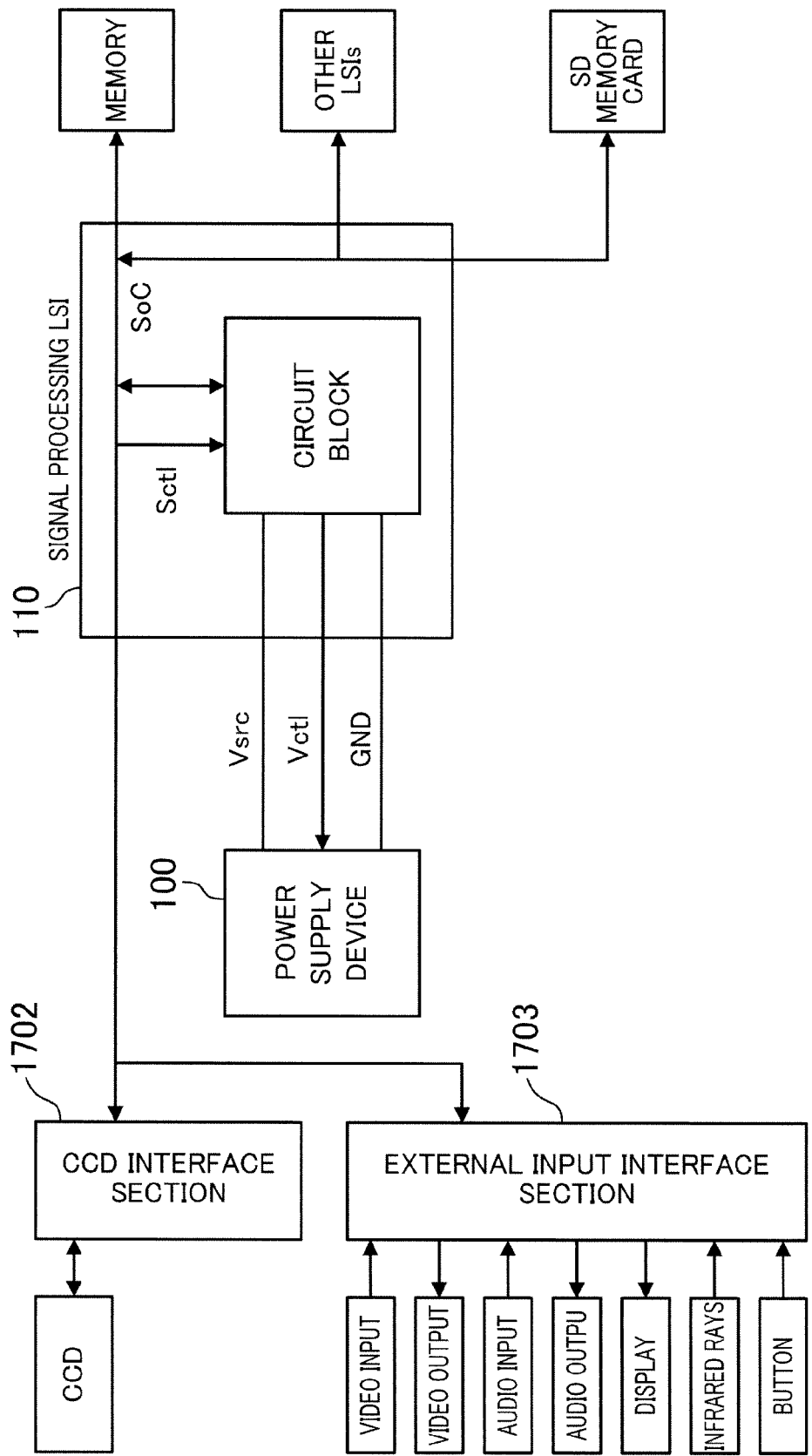
FIG. 20 is a block diagram illustrating a configuration of an imaging device according to an eleventh embodiment.

FIG. 20 is a block diagram illustrating a configuration of an imaging device according to an eleventh embodiment. The imaging device is, for example, a digital video camera including a power supply device 100 and a SoC section 110. The SoC section 110 is a signal processing LSI.

A charge coupled device (CCD) interface section 1702 converts a signal obtained from a CCD to a power supply control signal (Sctl). An interface section 1703 converts signals input from a video input, etc. to the Sctl. The signal processing LSI performs voltage control according to the Sctl. Thus, it is also possible to increase operation speed, and reduce power consumption of imaging devices.

Twelfth Embodiment

Figure 21:
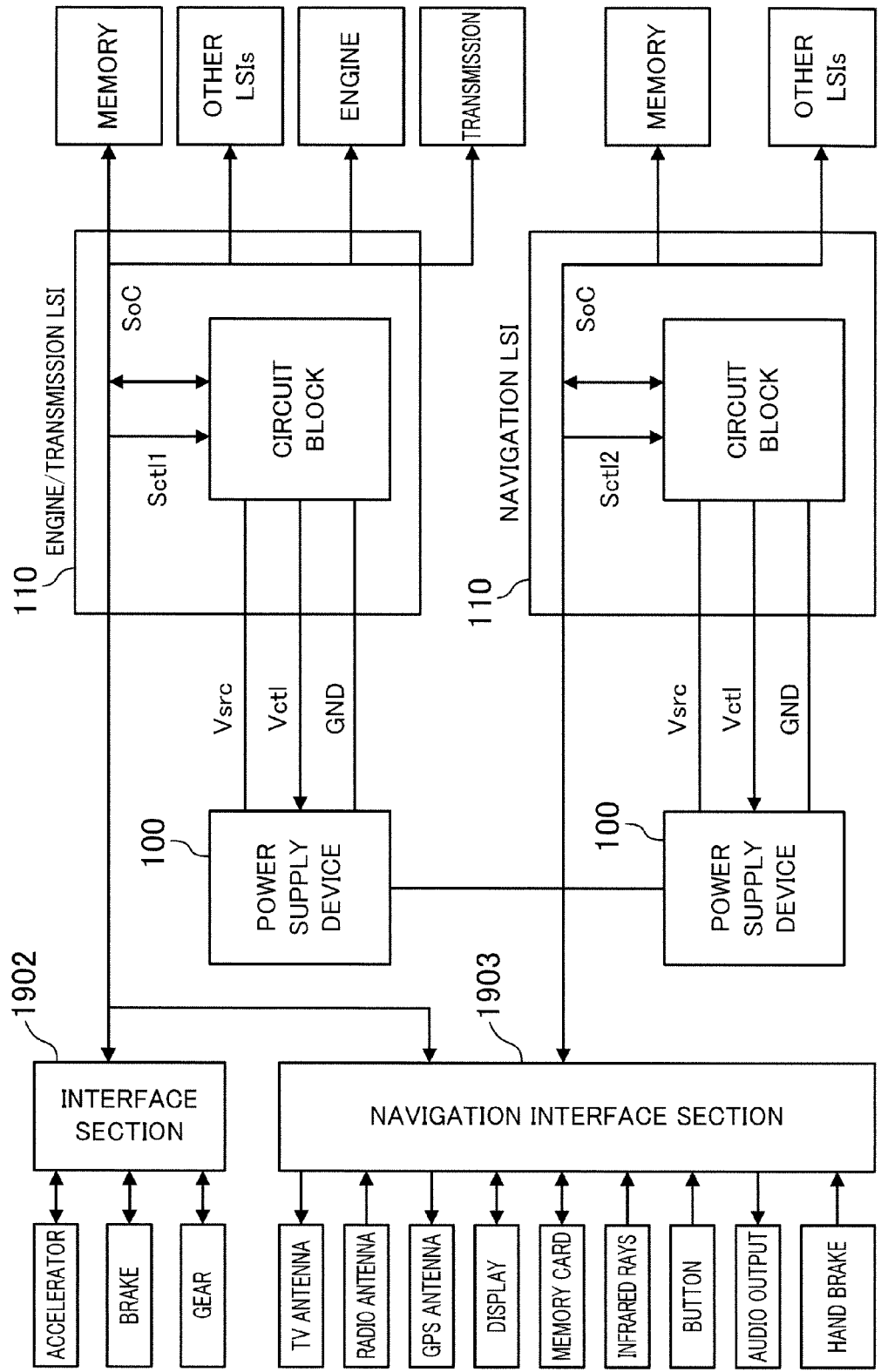
FIG. 21 is a block diagram illustrating configurations of an electronic control device and a navigation device according to a twelfth embodiment.
Figure 22:
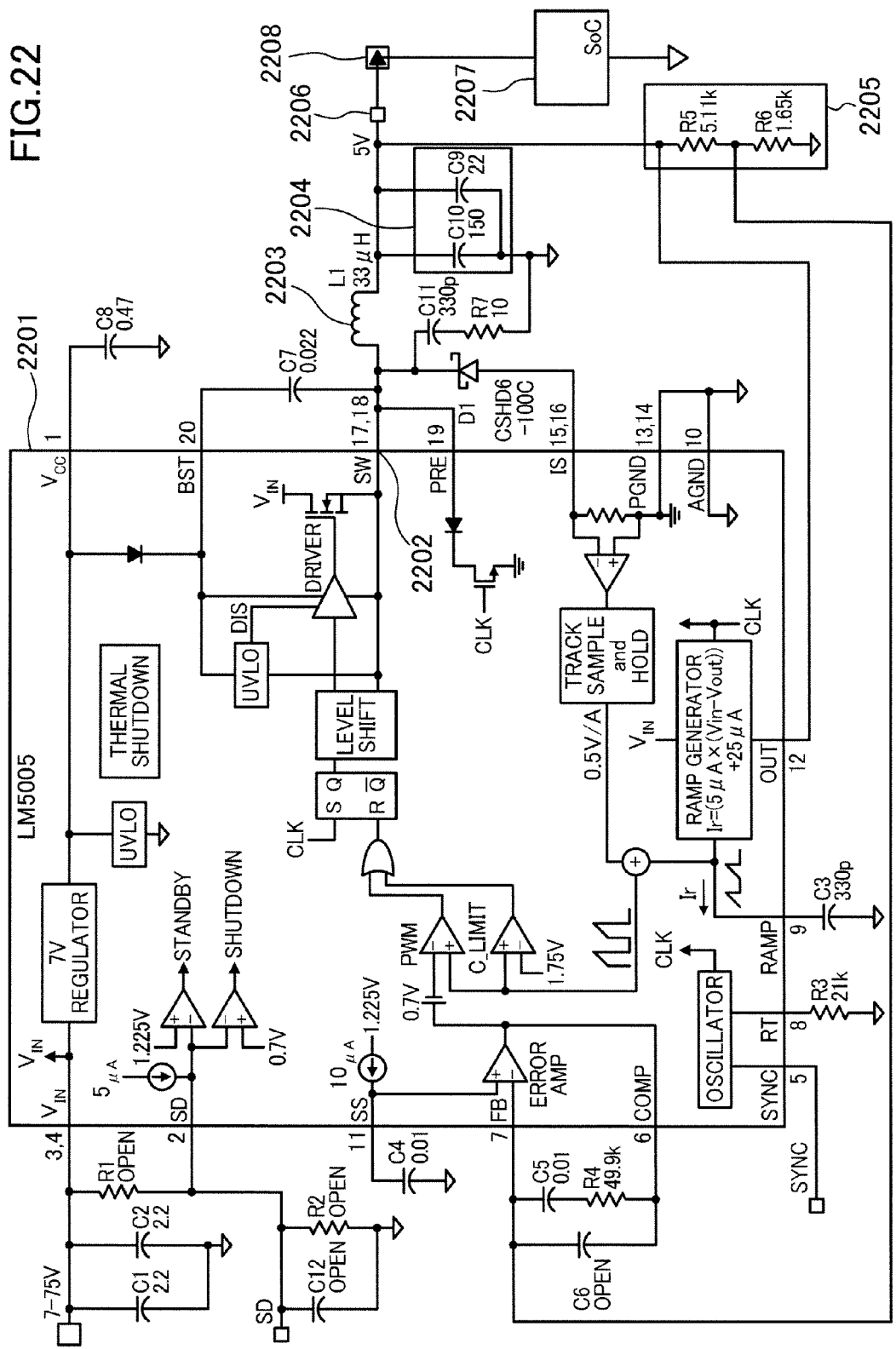
FIG. 22 is a circuit diagram illustrating a configuration of a conventional power supply system.
Figure 23:
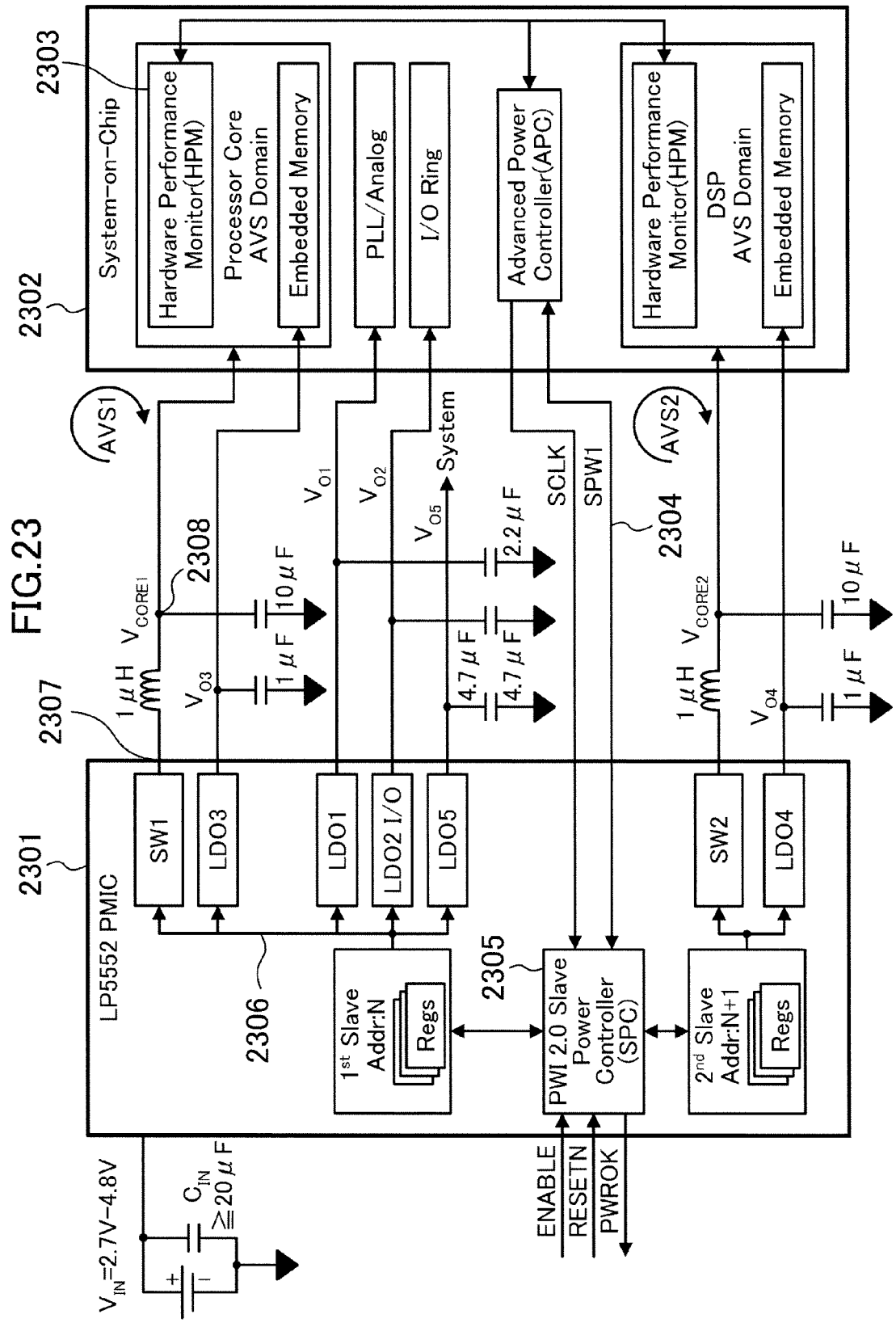
FIG. 23 is a circuit diagram illustrating a configuration of another conventional power supply system.

FIG. 21 is a block diagram illustrating configurations of an electronic control device and a navigation device according to a twelfth embodiment. The electronic control device and the navigation device include power supply devices 100 and SoC sections 110, and are mounted on a mobile object, for example, a vehicle. The SoC sections 110 are an engine/transmission control LSI and a navigation LSI.

An interface section 1902 converts signals input from an accelerator, etc. to a power supply control signal (Sctl1). A navigation interface section 1903 converts signals received by various antennas, etc. to a power supply control signal (Sctl2). The engine/transmission control LSI and the navigation LSI perform voltage control according to the Sctl1 and the Sctl2, respectively. Thus, it is also possible to increase operation speed and reduce power consumption of electronic control devices and navigation devices mounted on vehicles.

The semiconductor integrated circuit according to the present disclosure is capable of performing dynamic and high-resolution voltage control with a relatively simple configuration, and thus is useful for various electronic apparatuses, or the like which require fine voltage control and reduced cost.

What is claimed is:

1. A semiconductor integrated circuit which operates based on a power supply voltage output from a power supply device configured to generate a voltage of a magnitude in accordance with an analog control signal, the semiconductor integrated circuit comprising:
   a first terminal to which the power supply voltage is applied;
   an internal interconnect connected to the first terminal to distribute the power supply voltage to sections in the semiconductor integrated circuit;
   a second terminal from which the analog control signal is output;
   a first IO circuit connected to the first terminal; and
   a second IO circuit connected to the second terminal,
   wherein the analog control signal is generated to have a magnitude in accordance with a potential of the internal interconnect, and
   the first and second IO circuits are electrically isolated from each other.

2. The semiconductor integrated circuit of claim 1, further comprising:
   a potential monitor circuit configured to detect the potential of the internal interconnect; and
   a potential control circuit configured to generate the analog control signal having a magnitude in accordance with the potential detected by the potential monitor circuit.

3. The semiconductor integrated circuit of claim 2, wherein the potential control circuit is connected to a power supply voltage which is higher than the potential of the internal interconnect.

4. The semiconductor integrated circuit of claim 2, wherein the potential control circuit includes an analog buffer circuit, and outputs the analog control signal via the analog buffer circuit.

5. The semiconductor integrated circuit of claim 4, wherein the analog buffer circuit includes a MOS-FET supplied with a power supply voltage which is higher than the potential of the internal interconnect, and
   the MOS-FET has a higher breakdown voltage than a MOS-FET supplied with the potential of the internal interconnect.

6. The semiconductor integrated circuit of claim 4, wherein a phase compensation circuit or a gain compensation circuit is connected between an input and an output of the analog buffer circuit.

7. An electronic apparatus, comprising:
   the semiconductor integrated circuit of claim 1; and
   a power supply device configured to generate a power supply voltage of a magnitude in accordance with the analog control signal output from the semiconductor integrated circuit, and supply the generated power supply voltage to the semiconductor integrated circuit.

8. The electronic apparatus of claim 7, wherein the power supply device includes:
   a switching power supply circuit configured to perform switching control of a switching element at a duty ratio according to the analog control signal to vary an input voltage, and
   a smoothing circuit configured to smooth a square wave voltage output from the switching power supply circuit to generate the power supply voltage.

9. The electronic apparatus of claim 7, wherein an interconnect through which the analog control signal is transmitted from the semiconductor integrated circuit to the power supply device is shielded.

10. A communication device, comprising:
    the semiconductor integrated circuit of claim 1;
    a power supply device configured to generate a power supply voltage of a magnitude in accordance with the analog control signal output from the semiconductor integrated circuit, and supply the generated power supply voltage to the semiconductor integrated circuit;
    a high-frequency transmission/reception interface section connected to the semiconductor integrated circuit; and
    an external input interface section connected to the semiconductor integrated circuit.

11. An AV system comprising:
    the semiconductor integrated circuit of claim 1;
    a power supply device configured to generate a power supply voltage of a magnitude in accordance of the analog control signal output from the semiconductor integrated circuit, and supply the generated power supply voltage to the semiconductor integrated circuit;
    a tuner section connected to the semiconductor integrated circuit; and
    an interface section connected to the semiconductor integrated circuit.

12. An AV system comprising:
    the semiconductor integrated circuit of claim 1;
    a power supply device configured to generate a power supply voltage of a magnitude in accordance with the analog control signal output from the semiconductor integrated circuit, and supply the generated power supply voltage to the semiconductor integrated circuit;
    a network interface section connected to the semiconductor integrated circuit; and
    an external input interface section connected to the semiconductor integrated circuit.

13. An imaging device comprising:
    the semiconductor integrated circuit of claim 1;
    a power supply device configured to generate a power supply voltage of a magnitude in accordance with the analog control signal output from the semiconductor integrated circuit, and supply the generated power supply voltage to the semiconductor integrated circuit;
    a CCD interface section connected to the semiconductor integrated circuit; and
    an external input interface section connected to the semiconductor integrated circuit.

14. A navigation device comprising:
    the semiconductor integrated circuit of claim 1;
    a power supply device configured to generate a power supply voltage of a magnitude in accordance with the analog control signal output from the semiconductor integrated circuit, and supply the generated power supply voltage to the semiconductor integrated circuit; and
    a navigation interface section connected to the semiconductor integrated circuit.

15. A semiconductor integrated circuit which operates based on a power supply voltage output from a power supply device configured to generate a voltage of a magnitude in accordance with an analog control signal, the semiconductor integrated circuit comprising:
    a first terminal to which the power supply voltage is applied;
    an internal interconnect connected to the first terminal to distribute the power supply voltage to sections in the semiconductor integrated circuit;

a second terminal from which the analog control signal is output;

a potential monitor circuit configured to detect a potential of the internal interconnect;

a potential control circuit configured to generate the analog control signal having a magnitude in accordance with the potential detected by the potential monitor circuit; and a circuit block capable of being switched between a plurality of operation modes different in load, wherein before the circuit block is switched between the operation modes, the potential control circuit generates the analog control signal having a magnitude in accordance with an operation mode to which the circuit block will be switched.

16. A semiconductor integrated circuit which operates based on a power supply voltage output from a power supply device configured to generate a voltage of a magnitude in accordance with an analog control signal, the semiconductor integrated circuit comprising:

a first terminal to which the power supply voltage is applied;

an internal interconnect connected to the first terminal to distribute the power supply voltage to sections in the semiconductor integrated circuit;

a second terminal from which the analog control signal is output;

a potential monitor circuit configured to detect a potential of the internal interconnect; and a potential control circuit configured to generate the analog control signal having a magnitude in accordance with the potential detected by the potential monitor circuit, wherein the potential monitor circuit includes a MOS-FET supplied with a power supply voltage which is higher than the potential of the internal interconnect, and the MOS-FET has a higher breakdown voltage than a MOS-FET supplied with the potential of the internal interconnect.

17. A semiconductor integrated circuit which operates based on a power supply voltage output from a power supply device configured to generate a voltage of a magnitude in accordance with an analog control signal, the semiconductor integrated circuit comprising:

a first terminal to which the power supply voltage is applied;

an internal interconnect connected to the first terminal to distribute the power supply voltage to sections in the semiconductor integrated circuit;

a second terminal from which the analog control signal is output;

a potential monitor circuit configured to detect a potential of the internal interconnect;

a potential control circuit configured to generate the analog control signal having a magnitude in accordance with the potential detected by the potential monitor circuit; and a memory circuit configured to convert the potential detected by the potential monitor circuit into data, and store the converted data.

18. A semiconductor integrated circuit which operates based on a power supply voltage output from a power supply device configured to generate a voltage of a magnitude in accordance with an analog control signal, the semiconductor integrated circuit comprising:

a first terminal to which the power supply voltage is applied;

an internal interconnect connected to the first terminal to distribute the power supply voltage to sections in the semiconductor integrated circuit;

a second terminal from which the analog control signal is output;

a potential monitor circuit configured to detect a potential of the internal interconnect;

a potential control circuit configured to generate the analog control signal having a magnitude in accordance with the potential detected by the potential monitor circuit; and a memory circuit configured to convert the analog control signal to data, and store the converted data.

19. A semiconductor integrated circuit which operates based on a power supply voltage output from a power supply device configured to generate a voltage of a magnitude in accordance with a control signal having three or more voltage values, the semiconductor integrated circuit comprising:

a first terminal to which the power supply voltage is applied;

an internal interconnect which is connected to the first terminal, and distributes the power supply voltage to sections in the semiconductor integrated circuit;

a second terminal from which the control signal is output;

a first IO circuit connected to the first terminal; and a second IO circuit connected to the second terminal, wherein the control signal is generated to have a magnitude in accordance with a potential of the internal interconnect, and the first and second IO circuits are electrically isolated from each other.

* * * * *